(12) United States Patent
Furuta

(10) Patent No.: US 9,338,611 B2
(45) Date of Patent: May 10, 2016

(54) WIRELESS COMMUNICATION APPARATUS, DATA DISTRIBUTION APPARATUS, AND DATA UPDATING METHOD

(71) Applicant: FUJITSU LIMITED, Kawasaki-shi, Kanagawa (JP)

(72) Inventor: Daitarou Furuta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 85 days.

(21) Appl. No.: 13/658,649

(22) Filed: Oct. 23, 2012

(65) Prior Publication Data

US 2013/0148562 A1 Jun. 13, 2013

(30) Foreign Application Priority Data

Dec. 9, 2011 (JP) .................................. 2011-270362

(51) Int. Cl.
| | |
|---|---|
| H04W 4/06 | (2009.01) |
| H04W 12/04 | (2009.01) |
| H04W 4/00 | (2009.01) |
| H04W 4/14 | (2009.01) |
| H04W 12/06 | (2009.01) |

(52) U.S. Cl.
CPC ................ *H04W 4/06* (2013.01); *H04W 4/001* (2013.01); *H04W 4/14* (2013.01); *H04W 12/04* (2013.01); *H04W 12/06* (2013.01)

(58) Field of Classification Search
USPC .................................................. 370/312, 432
See application file for complete search history.

(56) References Cited

U.S. PATENT DOCUMENTS

| | | | |
|---|---|---|---|
| 2001/0006891 A1 | 7/2001 | Cho | |
| 2003/0022683 A1* | 1/2003 | Beckmann | H04W 72/005 455/518 |
| 2006/0265709 A1* | 11/2006 | Meaney | 717/178 |
| 2006/0280150 A1 | 12/2006 | Jha | |
| 2009/0207839 A1 | 8/2009 | Cedervall | |
| 2009/0323962 A1* | 12/2009 | Aciicmez et al. | 380/277 |
| 2010/0031327 A1 | 2/2010 | Kotani | |
| 2010/0265867 A1* | 10/2010 | Becker et al. | 370/312 |
| 2012/0134313 A1* | 5/2012 | Jung et al. | 370/312 |

FOREIGN PATENT DOCUMENTS

| | | |
|---|---|---|
| JP | 2001-230725 | 8/2001 |
| JP | 2004-157790 | 6/2004 |
| JP | 2006-311149 | 11/2006 |
| JP | 2008-547092 A | 12/2008 |
| JP | 2009-539304 A | 11/2009 |
| JP | 2010-114813 A | 5/2010 |

OTHER PUBLICATIONS

Office Action of JP Patent Application 2011-270362 dated Jun. 2, 2015. Partial translated office action.

* cited by examiner

*Primary Examiner* — Habte Mered
*Assistant Examiner* — Brian Cox
(74) *Attorney, Agent, or Firm* — Maschoff Brennan

(57) ABSTRACT

A wireless communication apparatus including: a memory to store data therein, and a processor to receive a message including setting information concerning settings of a multicast service bearer through which updating data used for updating the data is distributed, to access the multicast service bearer through which the updating data is distributed in accordance with the setting information, to receive the updating data distributed through the multicast service bearer, and to update the data by the updating data.

1 Claim, 20 Drawing Sheets

FIG. 4

| NAME | SENDER | INFORMATION ELEMENT |
|---|---|---|
| UPDATING EVENT OCCURRENCE NOTIFICATION | MOBILE STATION | NOTIFICATION TYPE (=0000) |
| | | EVENT CODE |
| | | TERMINAL IDENTIFICATION NUMBER |
| UPDATING INFORMATION NOTIFICATION | FW UPDATING SERVER | NOTIFICATION TYPE (=0001) |
| | | PROCESS IDENTIFICATION CODE |
| | | PUBLIC KEY |
| | | MBMS BEARER IDENTIFIER |
| | | TRANSMISSION START TIME |
| UPDATING COMPLETION NOTIFICATION | MOBILE STATION | NOTIFICATION TYPE (=0002) |
| | | PROCESS IDENTIFICATION CODE |
| | | TERMINAL IDENTIFICATION NUMBER |
| UPDATING FAILURE NOTIFICATION | MOBILE STATION | NOTIFICATION TYPE (=0003) |
| | | PROCESS IDENTIFICATION CODE |
| | | TERMINAL IDENTIFICATION NUMBER |
| UPDATING INFORMATION ABSENCE INFORMATION | FW UPDATING SERVER | NOTIFICATION TYPE (=0005) |
| | | PROCESS IDENTIFICATION CODE |
| | | UPDATING DATA PRESENCE/ABSENCE |

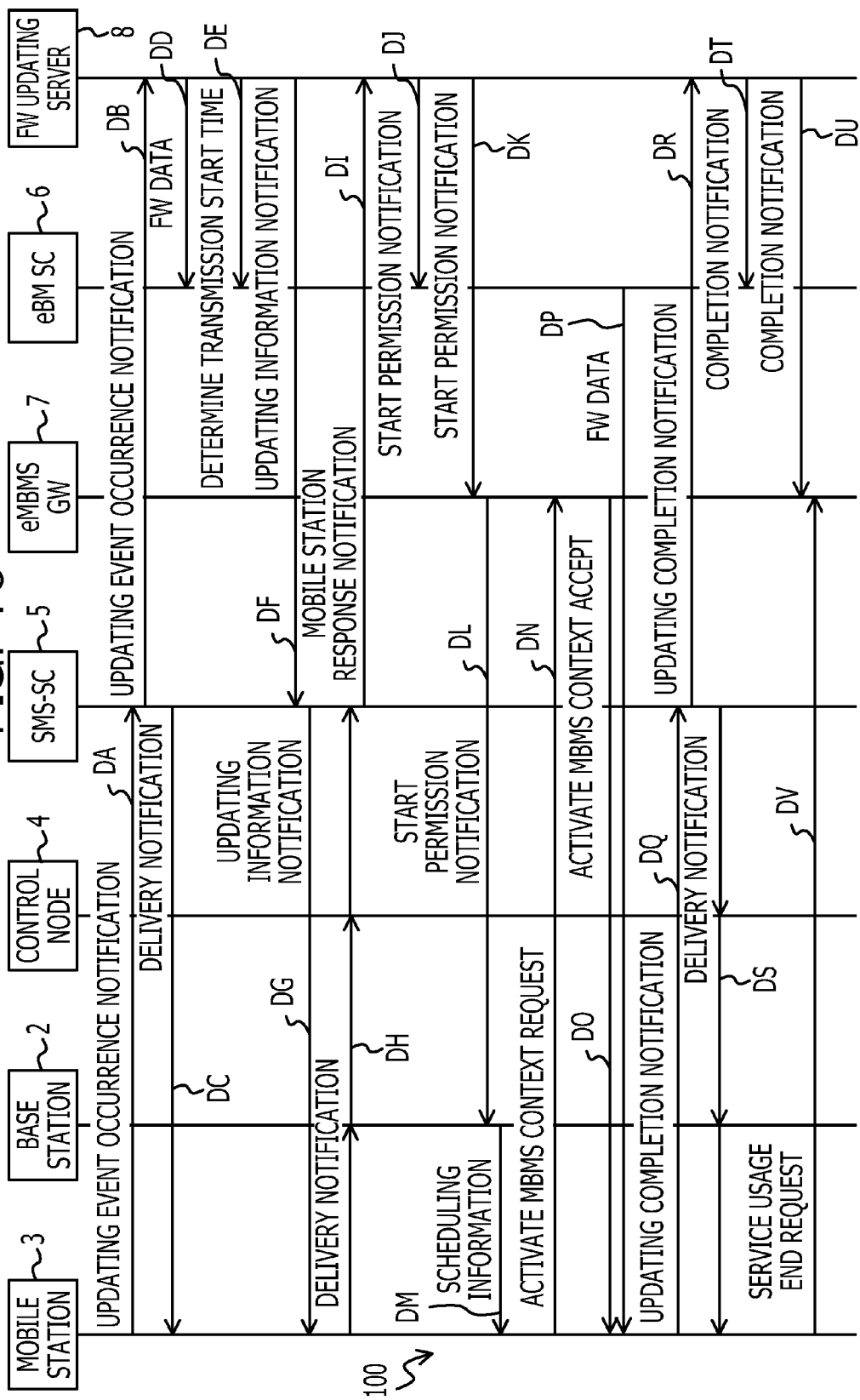

FIG. 11

| NAME | SENDER | INFORMATION ELEMENT |
|---|---|---|
| UPDATING EVENT OCCURRENCE NOTIFICATION | MOBILE STATION | NOTIFICATION TYPE (=0000) |
| | | EVENT CODE |
| | | TERMINAL IDENTIFICATION NUMBER |
| UPDATING INFORMATION NOTIFICATION | FW UPDATING SERVER | NOTIFICATION TYPE (=0001) |
| | | PROCESS IDENTIFICATION CODE |
| | | PUBLIC KEY |
| | | MBMS BEARER IDENTIFIER |
| | | TRANSMISSION START TIME |
| UPDATING COMPLETION NOTIFICATION | MOBILE STATION | NOTIFICATION TYPE (=0002) |
| | | PROCESS IDENTIFICATION CODE |
| | | TERMINAL IDENTIFICATION NUMBER |
| UPDATING FAILURE NOTIFICATION | MOBILE STATION | NOTIFICATION TYPE (=0003) |
| | | PROCESS IDENTIFICATION CODE |
| | | TERMINAL IDENTIFICATION NUMBER |
| UPDATING REQUEST NOTIFICATION | MOBILE STATION | NOTIFICATION TYPE (=0004) |
| | | TERMINAL IDENTIFICATION NUMBER |
| UPDATING INFORMATION ABSENCE INFORMATION | FW UPDATING SERVER | NOTIFICATION TYPE (=0005) |
| | | PROCESS IDENTIFICATION CODE |
| | | UPDATING DATA PRESENCE/ABSENCE |

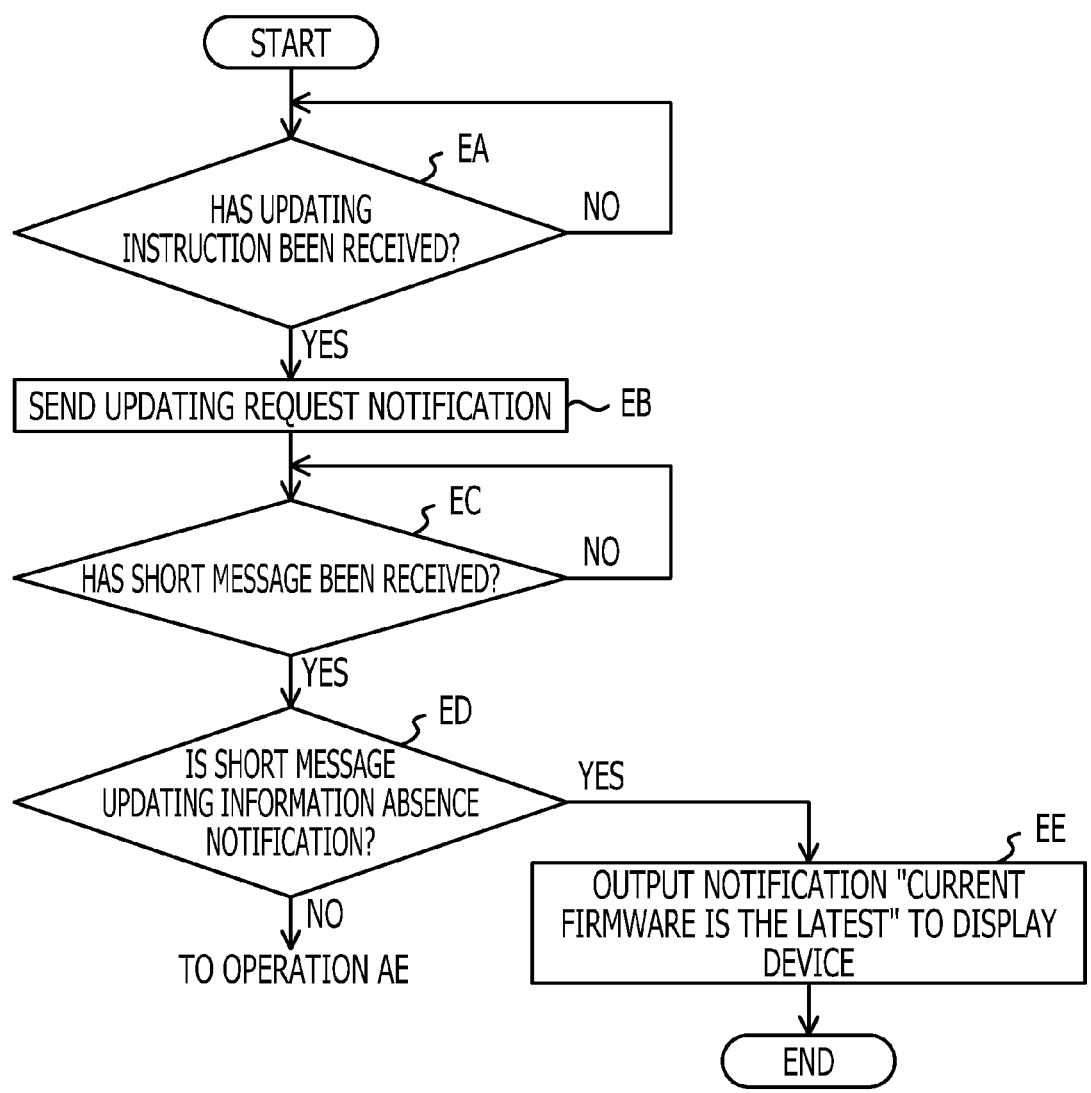

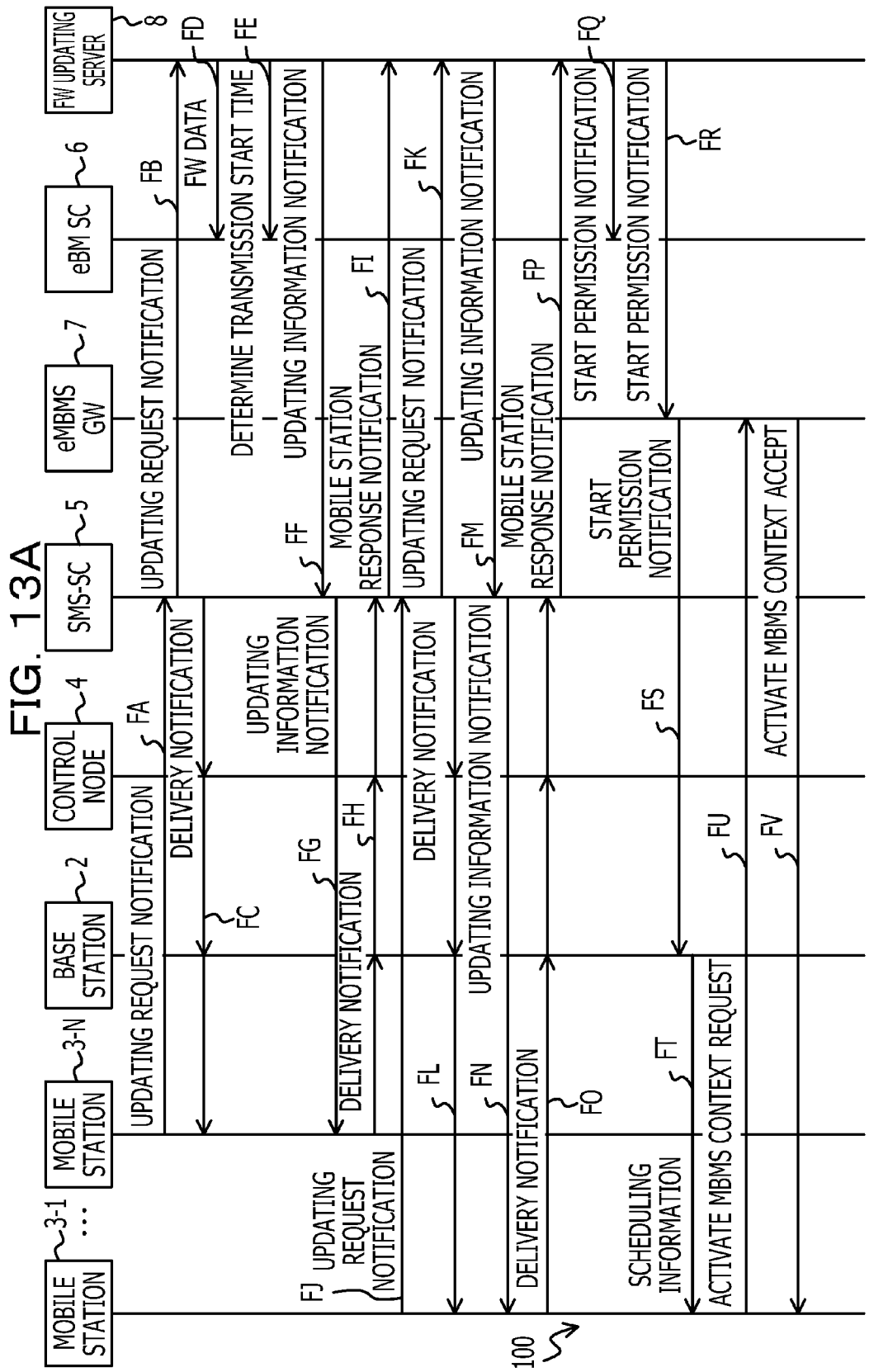

WIRELESS COMMUNICATION APPARATUS, DATA DISTRIBUTION APPARATUS, AND DATA UPDATING METHOD

CROSS-REFERENCE TO RELATED APPLICATION

This application is based upon and claims the benefit of priority of the prior Japanese Patent Application No. 2011-270362, filed on Dec. 9, 2011, the entire contents of which are incorporated herein by reference.

FIELD

The embodiments discussed herein are related to an updating method for data stored in a wireless communication apparatus and used in this wireless communication apparatus.

BACKGROUND

Among data items stored and used in a wireless communication apparatus, for some data items, a new version is created after the lapse of a certain time. In the following description, such data items may be referred to as "device usage data" in order to distinguish them from other data items. Examples of the device usage data are software, firmware, and driver programs which are executed by a processor of a wireless communication apparatus, circuit information used in programmable logic devices, and map data used in navigation programs.

In order to manage verification of firmware in wireless communication apparatuses, the following method, for example, is known. An information log including verification test results is sent to a user management server by performing piggybacking by using short message services.

A device management (DM) server that is capable of remotely managing and controlling mobile information processing terminals, such as cellular phones, and thereby performs updating and fault diagnosis of firmware of cellular phones and sets various settings for the cellular phones is known. The DM server obtains application operating information, together with information received from a cellular phone while communicating with the cellular phone by using Open Mobile Alliance-Device Management (OMA-DM) protocols in order to perform updating and fault diagnosis of firmware of the cellular phone and to set various settings for the cellular phone. Upon receiving, from the cellular phone, fault detection information, which is set if a fault has been detected, the DM server detects the occurrence of a fault in the cellular phone and remotely instructs the cellular phone to restart or to set various settings. In response to this instruction, a firmware updating section of the cellular phone executes processing in accordance with the content of the instruction.

In communication networking, a method for distributing a file to a plurality of receivers that utilize a multicast channel is known. In this method, a set of instructions concerning file distribution are sent from an application server platform. Each of the instructions includes at least one attribute that specifies a condition concerning an approach to processing the instruction and the associated file content. This attribute includes a type that specifies an approach to processing a file instance. This type includes "upgrade" indicating that the content of the file instance will be used for upgrading firmware.

Examples of the above-described related art are disclosed in Japanese Laid-open Patent Publication No. 2010-114813 and Japanese National Publication of International Patent Application Nos. 2008-547092 and 2009-539304.

SUMMARY

According to an aspect of the invention, a wireless communication apparatus includes a memory to store data therein, and a processor to receive a message including setting information concerning settings of a multicast service bearer through which updating data used for updating the data is distributed, to access the multicast service bearer through which the updating data is distributed in accordance with the setting information, to receive the updating data distributed through the multicast service bearer, and to update the data by the updating data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a first example of a list of short messages used for downloading firmware.

FIG. 10 illustrates a first example of a sequence of signals transmitted in the communication system.

FIG. 11 illustrates a second example of a list of short messages used for downloading firmware.

FIG. 12 illustrates a first example of an operation performed by a mobile station when receiving an updating instruction.

FIGS. 13A and 13B illustrate a second example of a sequence of signals transmitted in the communication system.

DESCRIPTION OF EMBODIMENTS

Hitherto, when downloading updated device usage data via a wireless communication network, the updated device usage data is transmitted via a dedicated data channel assigned to each wireless communication apparatus. This causes a decrease in the quality of other services which utilize the dedicated data channel.

It is an object of the embodiments discussed herein to provide a wireless communication apparatus, a data distribution apparatus, and a data updating method in which a decrease in the quality of other services caused by downloading of device usage data via a wireless communication network is reduced.

Preferred embodiments will be described below with reference to the accompanying drawings. In this specification, a description will be given, assuming that firmware, which is an example of device usage data stored in a wireless communication apparatus and used in this wireless communication apparatus, is downloaded via a wireless communication network. However, this illustration is only an example and it is not intended to restrict the subject to be downloaded by using an apparatus and a method described in this specification to firmware. Examples of subjects to be downloaded in this specification are, not only firmware, but also software and driver programs which are executed by a processor of a wireless communication apparatus and circuit information used in programmable logic devices. Other examples of subjects to be downloaded in this specification are various items of data integrated in a wireless communication apparatus, such as map data.

In the following description and drawings, the following abbreviations are used.

FM: firmware
IMEI: International Mobile Equipment Identifier
MBMS: Multimedia Broadcast Multicast Service
eMBMSGW: evolved Multimedia Broadcast Multicast Service Gateway
NIF: Network Interface
SMS: Short Message Service
SMS-SC: Short Message Service-Service Center
TAC: Type Approval Code

1. Example of System Configuration

Figure 1:
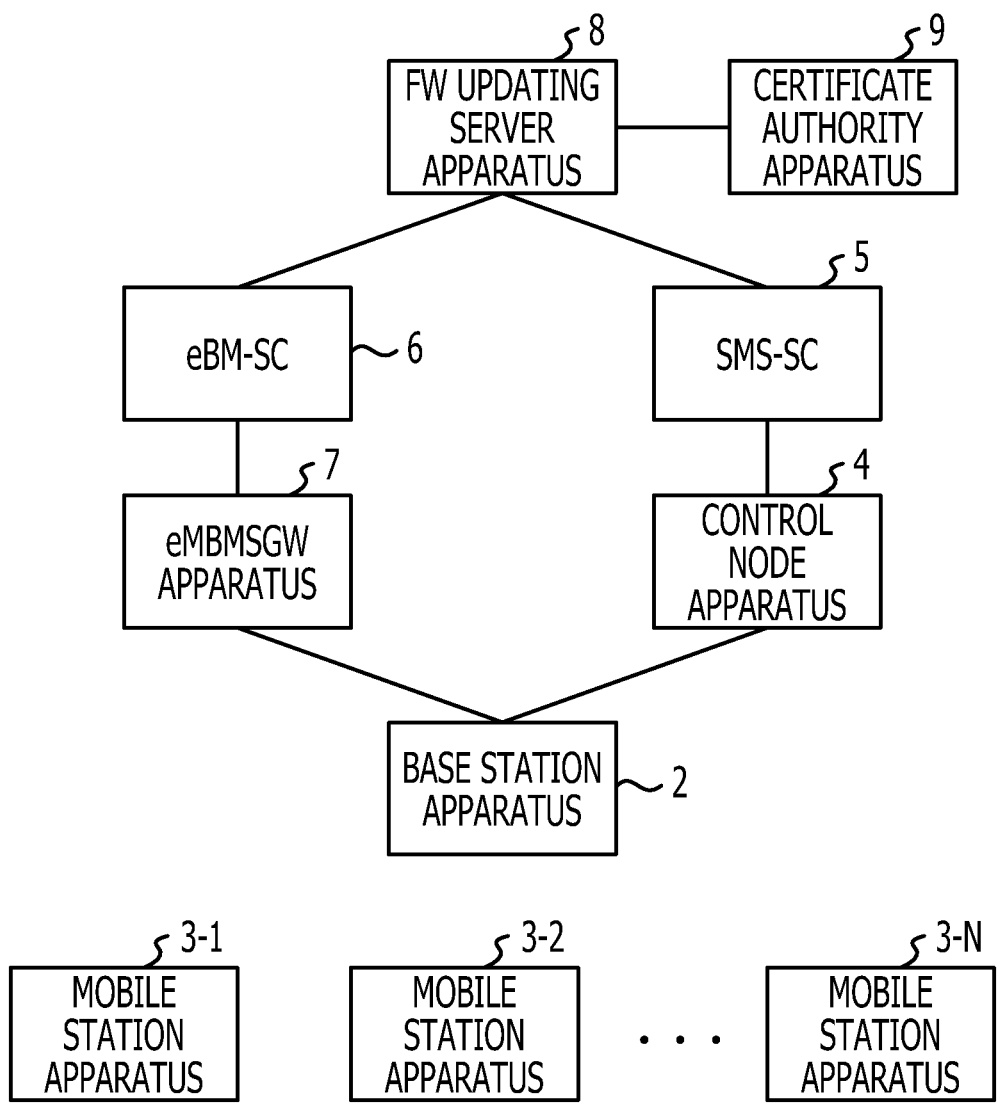
FIG. 1 illustrates an example of the overall configuration of a communication system.

FIG. 1 illustrates an example of the overall configuration of a communication system 1. The communication system 1 includes a base station apparatus 2, mobile station apparatuses 3-1 through 3-N, a control node apparatus 4, an SMS-SC 5, an eBM-SC 6, an eMBMSGW apparatus 7, and an FW updating server apparatus 8. In the following description and drawings, the base station apparatus 2, the mobile station apparatuses 3-1 through 3-N, the control node apparatus 4, the eMBMSGW apparatus 7, and the FW updating server apparatus 8 may be referred to as the "base station 2", "mobile stations 3-1 through 3-N", "control node 4", "eMBMSGW 7", and "FW updating server 8", respectively. The mobile stations 3-1 through 3-N may be generically referred to as a "mobile station 3" or "mobile stations 3".

The base station 2 is a wireless station apparatus that relays services in accordance with predetermined wireless communication standards between a core network and the mobile stations 3 of users who receive mobile communication services. The predetermined wireless communication standards may be Wideband Code Division Multiple Access (W-CDMA) or Long Term Evolution (LTE) defined in 3rd Generation Partnership Project (3GPP).

The mobile stations 3 are terminal apparatuses used by users when performing communication via the Internet, such as a web, or performing audio communication via a public circuit or another mobile communication network.

The control node 4 is a node apparatus that is disposed in a core network connected to a wireless access network, which connects the base station 2 and the mobile stations 3, and that controls wireless communication in the wireless access network. For example, if the communication system 1 is a W-CDMA communication system, the control node 4 may be Radio Network Controller (RNC). If the communication system 1 is an LTE communication system, the control node 4 may be Mobility Management Entity (MME).

The SMS-SC 5 relays, transfers, and stores short message services which are sent and received by the mobile stations 3 in the communication system 1. The control node 4 has a function to switch between the mobile stations 3 positioned within a coverage area and sets a path for short messages.

The SMS-SC 5 transforms short messages addressed to the FW updating server apparatus 8 into Internet Protocol (IP) packets in accordance with Short Message Peer to Peer Protocol (SMPP) and transmits the IP packets to the FW updating server apparatus 8 in an IP network. The SMS-SC 5 determines which mobile stations 3 to receive IP packets sent from the FW updating server apparatus 8 in accordance with the results of analyzing short messages sent from the mobile stations 3 to the FW updating server apparatus 8. The SMS-SC 5 transforms the IP packets sent from the FW updating server 8 into short messages addressed to the mobile stations 3 and transmits the short messages to the mobile stations 3.

The eBM-SC 6 receives, from the outside of the core network, distribution data which is distributed by a distribution data provider through MBMS. The eBM-SC 6 generates parameters concerning provision, delivery, publicizing, authentication, and storage of MBMS. The eMBMSGW 7 distributes distribution data received by the eBM-SC 6 to the mobile stations 3 via the base station 2 which covers a cell in which the mobile stations 3 are positioned.

When updating firmware to be executed in the mobile stations 3, the FW updating server 8 distributes firmware to the mobile stations 3 via a multicast communication channel, which is different from dedicated data channels assigned to the individual mobile stations 3. The multicast communication channel is a channel through which the same data is distributed to the plurality of mobile stations 3 at the same time. An example of communication services utilizing the multicast communication channel is, for example, MBMS defined in 3GPP.

In this specification, a description will be given, assuming that the communication service utilizing the multicast communication channel is MBMS. However, this illustration is only an example and it is not intended to restrict the communication service utilizing the multicast communication channel used by an apparatus and method described in this specification to MBMS. The apparatus and method described in this specification may be applied to another form of the multicast communication channel. When distributing firmware by utilizing MBMS, the FW updating server 8 exchanges information for distributing firmware through MBMS with the mobile stations 3 by using short messages.

In order to authenticate firmware to be distributed, the FW updating server 8 receives, from a certificate authority apparatus 9, a server certificate, a public key, and a private key created by a certificate authority. When distributing firmware by utilizing MBMS, the FW updating server 8 creates a digital certificate for firmware by using the private key and transmits the digital certificate to the mobile stations 3. The mobile stations 3 perform authentication processing for firmware by using the received digital certificate and public key so as to determine the authenticity of the received firmware.

2. First Embodiment 2-1. Example of Configuration of Mobile Station 3

2.1.1. Hardware Configuration of Mobile Station 3

Figure 2:
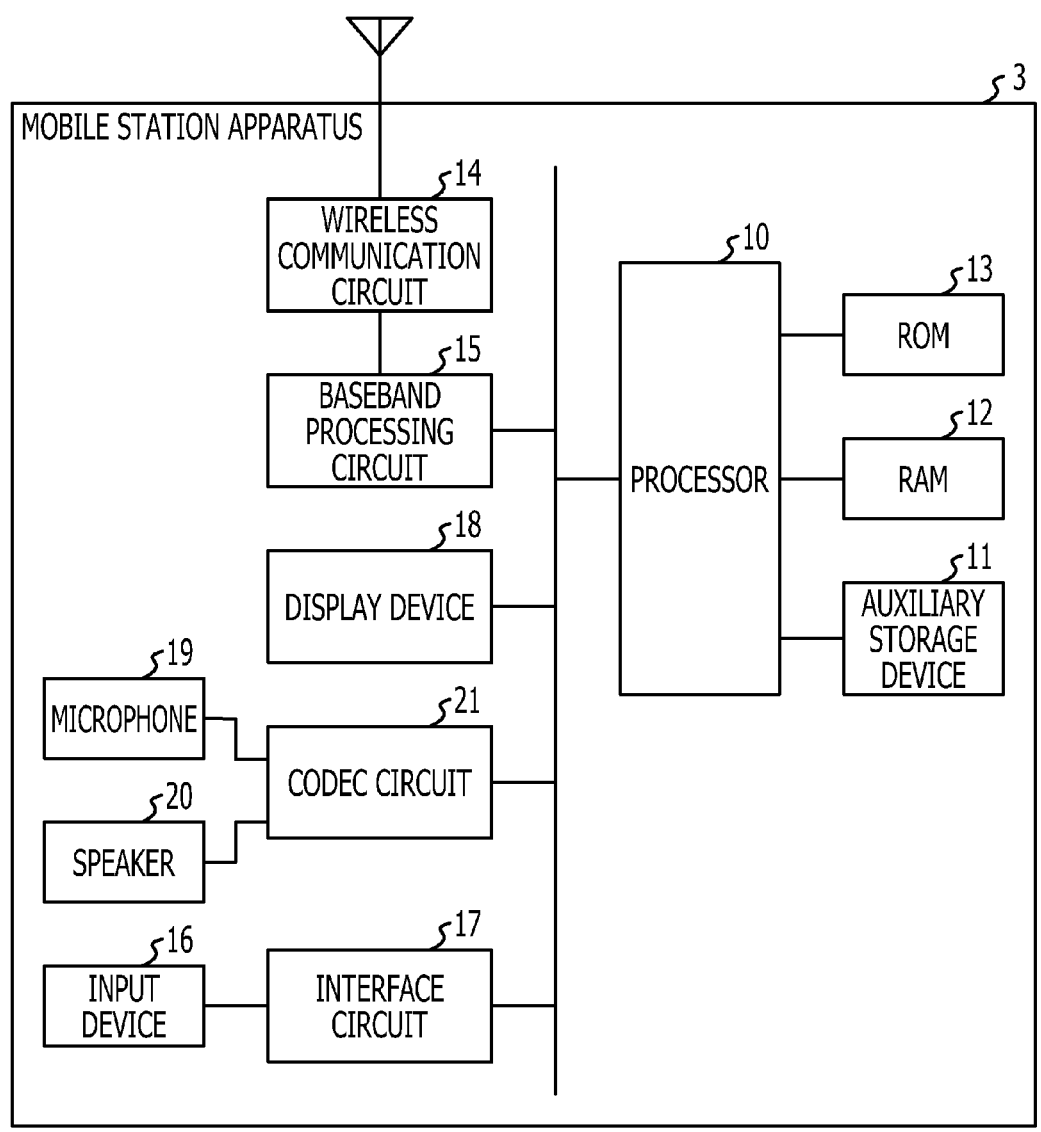
FIG. 2 illustrates an example of the hardware configuration of a mobile station.

The individual components forming the communication system 1 will be discussed below. FIG. 2 illustrates an example of the hardware configuration of the mobile station 3. The hardware configuration of the mobile station 3 illustrated in FIG. 2 is only an example, and another hardware configuration may be employed as long as it executes the following processing described in this specification.

The mobile station 3 includes a processor 10, an auxiliary storage device 11, a random access memory (RAM) 12, a read only memory (ROM) 13, and a wireless communication circuit 14. The mobile station 3 also includes a baseband processing circuit 15, an input device 16, an interface circuit 17, a display device 18, a microphone 19, a speaker 20, and a codec circuit 21.

The processor 10 executes a computer program stored in the auxiliary storage device 11 so as to execute information processing for application software used by a user of the mobile station 3 and to execute updating processing for firmware operating in the mobile station 3. The updating processing will be discussed later. The auxiliary storage device 11 includes a non-volatile storage device for storing therein the computer program and data used for executing the computer program. The non-volatile storage device may be a flash memory or a hard disk.

In the RAM 12, data and temporary data used by the processor 10 when executing a communication control program are stored. In the ROM 13, destination account information used for transmitting short messages to the FW updating server apparatus 8 and IMEI of the mobile station 3 are stored. The destination account information may include a telephone number and a number type for transmitting short messages to the FW updating server apparatus 8. The destination account information and IMEI may be recorded in the ROM 13, for example, at the time of shipping of the mobile station 3.

The wireless communication circuit 14 transmits and receives wireless signals when performing wireless communication with the base station 2. The baseband processing circuit 15 performs baseband processing concerning signals transmitted and received when performing wireless communication with the base station 2. The baseband processing circuit 15 may include a digital signal processor (DSP) and a memory in which firmware executed by the DSP is stored. The baseband processing circuit 15 may also include logic circuits, such as a large scale integration (LSI), an application specific integrated circuit (ASIC), and field-programmable gate array (FPGA), for executing baseband processing.

The input device 16 is a user interface device for receiving input operations performed by the user on the mobile station 3. The input device 16 may include a numeric pad for inputting telephone numbers, cursor keys, and dedicated keys for specific operations. The input device 16 may include a touch panel. The interface circuit 17 executes signal processing for outputting an input signal received from the input device 16 to the processor 10.

The microphone 19 receives the input of sound to be transmitted. The speaker 20 outputs received sound. The codec circuit 21 converts an analog audio signal detected by the microphone 19 into a digital signal and outputs the digital signal to the processor 10. The codec circuit 21 converts a digital audio signal output from the processor 10 into an analog signal and outputs the analog signal to the speaker 20.

2.1.2. Functional Configuration of Mobile Station 3

Figure 3:
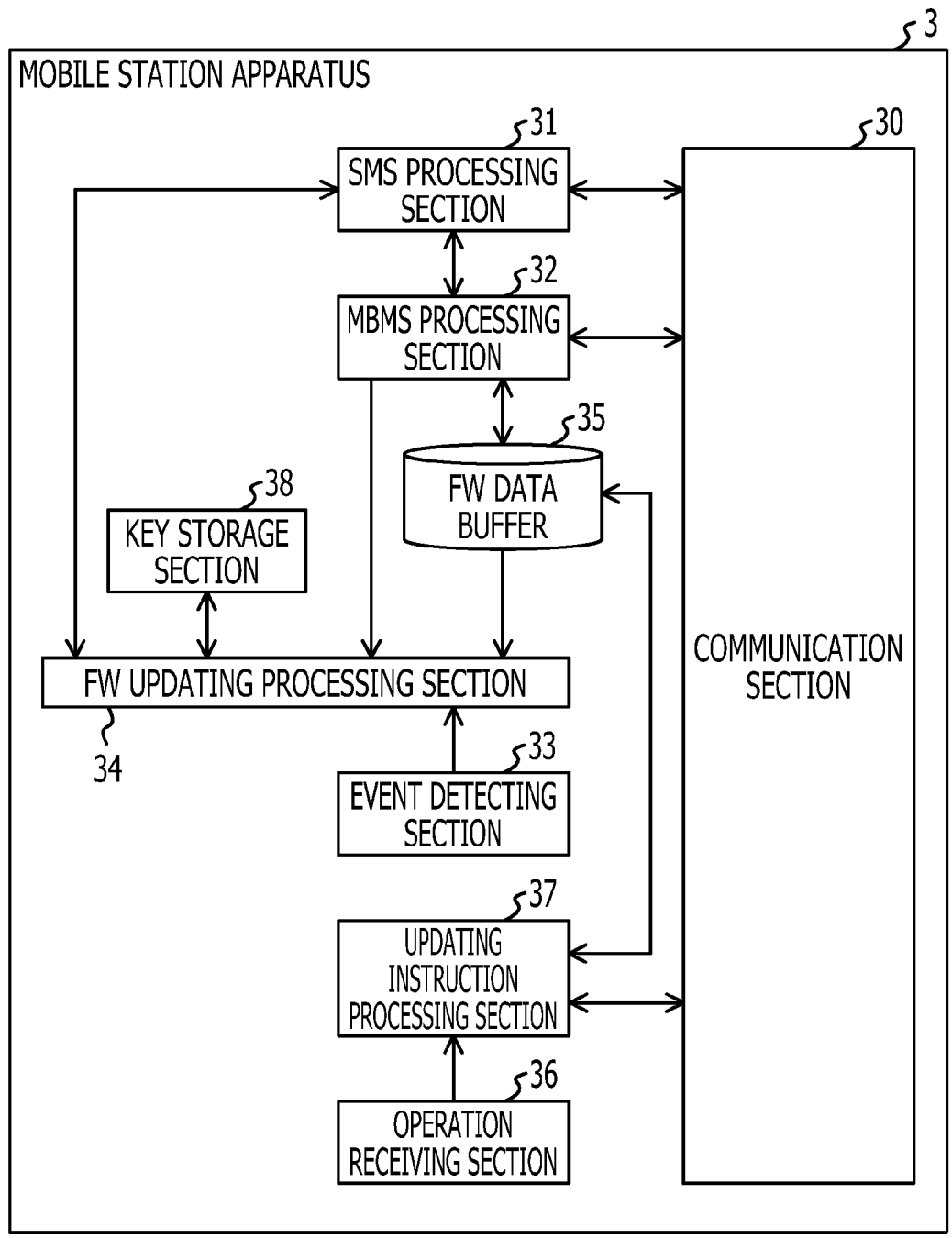
FIG. 3 illustrates an example of a functional block diagram illustrating a mobile station.

The functions of the mobile station 3 implemented by the above-described hardware configuration will now be described below. FIG. 3 illustrates an example of a functional block diagram illustrating the mobile station 3. The mobile station 3 includes a communication section 30, an SMS processing section 31, an MBMS processing section 32, an event detecting section 33, an FW updating processing section 34, an FW data buffer 35, an operation receiving section 36, an updating instruction processing section 37, and a key storage section 38. The functions illustrated in FIG. 3 are basic functions, which will be discussed below, and the mobile station 3 may include components other than the components illustrated in FIG. 3.

The communication section 30 transmits and receives signals and data through individual channels determined by the wireless communication standards of the communication system 1. These channels include a control channel through which short messages are sent, a data channel assigned to each mobile station 3, a channel through which MBMS traffic is transmitted, a channel through which an MBMS control signal is transmitted, etc. In the following description, the control channel through which short messages are sent and the data channel assigned to each mobile stations 3 may be referred to as "control channel" and "data channel", respectively. The channel through which MBMS traffic is transmitted and the channel through which the MBMS control signal is transmitted may be referred to as "MBMS data channel" and "MBMS control channel", respectively.

If the communication system 1 is an LTE communication system, the control channel and data channel are a dedicated control channel (DCCH) and a dedicated traffic channel (DTCH), respectively, and the MBMS data channel and MBMS control channel are a multicast traffic channel (MTCH) and a multicast control channel (MCCH), respectively.

The SMS processing section 31 performs processing for short messages sent and received by the mobile station 3. The SMS processing section 31 transmits and receives short messages used for downloading firmware through MBMS to and from the FW updating server 8. FIG. 4 illustrates a first example of a list of short messages used for downloading firmware. The list of short messages illustrated in FIG. 4 includes an updating event occurrence notification, an updating information notification, an updating completion notification, an updating failure notification, and an updating information absence notification.

The updating event occurrence notification is a short message which is supplied when the event detecting section 33 has detected a predetermined event so as to inform the FW updating server 8 by the mobile station 3 of the occurrence of the predetermined event. The predetermined event is, for example, the occurrence of a fault in the mobile station 3. Examples of such an event are unexpected resetting of the mobile station 3 and detection of an abnormality using a self-diagnostic program.

The updating event occurrence notification includes information elements "notification type", "event code", and "terminal identification number". The information element "notification type" indicates the type of short message, and in the case of transmitting of an updating event occurrence notification, the value "0000" may be input. The information element "event code" indicates an event occurred in the mobile station 3 and detected by the event detecting section 33. The information element "terminal identification number" indicates IMEI of the mobile station 3.

The updating information notification is a short message which informs the mobile station 3 by the FW updating server 8 that FW data for updating firmware used by the mobile station 3 will be sent by using MBMS. Upon receiving, for example, an updating event occurrence notification, the FW updating server 8 transmits an updating information notification if there is updating FW data for the mobile station 3.

The updating information notification includes information elements "notification type", "process identification code", "public key", "MBMS bearer identifier", and "transmission start time". The information element "notification type" indicates the type of short message, and in the case of transmitting of an updating information notification, the value "0001" may be input. The information element "process identification code" indicates identifiers of a series of short messages sent and received after transmitting an updating information notification in order to download FW data through MBMS. The information element "public key" is a public key received from the certificate authority apparatus 9 by the FW updating server 8.

The information element "MBMS bearer identifier" and "transmission start time" are setting information concerning settings of an MBMS bearer through which FW data is distributed. The MBMS bearer identifier is an identifier of MBMS bearer services through which FW data is transmitted. The MBMS bearer identifier may be an IP multicast address. In a certain embodiment, the MBMS bearer identifier may be stored in the ROM 13. In this case, the updating information notification may not include an MBMS bearer identifier. The transmission start time indicates the estimated transmission start time at which the transmission of FW data through MBMS will start.

The updating completion notification is a short message which informs the FW updating server 8 by the mobile station 3 of the completion of the downloading of FW data through MBMS. The updating completion notification includes information elements "notification type", "process identification code", and "terminal identification number". The information element "notification type" indicates the type of short message, and in the case of transmitting of an updating completion notification, the value "0002" may be input.

The updating failure notification is a short message which informs the FW updating server 8 by the mobile station 3 that the downloading of FW data through MBMS has failed. The updating failure notification includes information elements "notification type", "process identification code", and "terminal identification number". The information element "notification type" indicates the type of short message, and in the case of transmitting of an updating failure notification, the value "0003" may be input.

The updating information absence notification is a short message which informs the mobile station 3 by the FW updating server 8 that FW data for updating firmware used in the mobile station 3 will not be sent through MBMS. Upon receiving, for example, an updating event occurrence notification, the FW updating server 8 transmits an updating information absence notification if there is no updating FW data for the mobile station 3. The updating information absence notification includes information elements "notification type", "process identification code", and "updating data presence/absence information". The information element "notification type" indicates the type of short message, and in the case of transmitting of an updating information absence notification, the value "0005" may be input.

Upon detection of a predetermined event by the event detecting section 33, the SMS processing section 31 transmits an updating event occurrence notification. Upon receiving an updating information notification, the SMS processing section 31 obtains a public key, an MBMS bearer identifier, and transmission start time from the updating information notification, and outputs the MBMS bearer identifier to the MBMS processing section 32.

The MBMS processing section 32 performs access processing for accessing an MBMS bearer used for downloading FW data by the mobile station 3. In the access processing, the MBMS processing section 32 activates the MBMS bearer by transmitting the MBMS bearer identifier to the eMBMSGW 7. The MBMS processing section 32 also sets parameters for demodulation and coding processing for MBMS distribution data in accordance with scheduling information concerning the scheduling of the MBMS data channel and the MBMS control channel obtained from reporting information. The MBMS processing section 32 then starts a reception task of the MBMS distribution data. Upon completion of the MBMS bearer access processing, the SMS processing section 31 outputs an MBMS construction notification indicating the completion of access processing and the public key to the FW updating processing section 34. The MBMS processing section 32 then receives FW data distributed via the MBMS data channel and stores the FW data in the FW data buffer 35.

The event detecting section 33 detects a predetermined event occurred in the mobile station 3. Upon detection of a predetermined event by the event detecting section 33, the FW updating processing section 34 outputs an event notification indicating the occurrence of a predetermined event to the SMS processing section 31. The FW updating processing section 34 stores the public key received from the SMS processing section 31 in the key storage section 38. Upon completion of downloading of FW data through MBMS, the FW updating processing section 34 performs authentication processing for the downloaded FW data by using the public key stored in the key storage section 38. If authentication has succeeded, the FW updating processing section 34 updates firmware stored in the auxiliary storage device 11 and to be executed in the mobile station 3 by using the downloaded FW data.

The operation receiving section 36 receives an instruction to update firmware through an operation performed on the input device 16 by a user. Upon receiving an updating instruction from the user, the updating instruction processing section 37 performs processing for receiving updating FW data from the FW updating server 8. In this embodiment, if downloading is started in response to an updating instruction from the user, FW data is downloaded via a data channel.

The above-described operation performed by the communication section 30 is performed by the wireless communication circuit 14 and the baseband processing circuit 15 illustrated in FIG. 2. The above-described processing operations performed by the SMS processing section 31, the MBMS processing section 32, the event detecting section 33, the FW updating processing section 34, and the updating instruction processing section 37 are performed by the processor 10. The above-described operation performed by the operation receiving section 36 is performed by the input device 16 and the interface circuit 17. The FW data stored in the FW data buffer 35 and the public key stored in the key storage section 38 are stored in the auxiliary storage device 11 or the RAM 12.

2.2. First Configuration of FW Updating Server 8

2.2.1. Hardware Configuration of FW Updating Server 8

Figure 5:
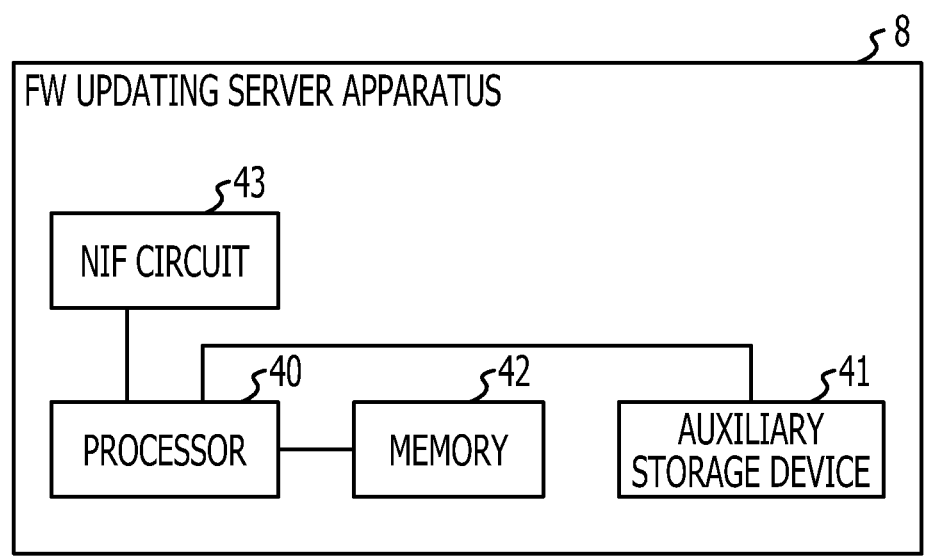
FIG. 5 illustrates an example of the hardware configuration of a firmware updating server.

The configuration of the FW updating server 8 will be discussed below. FIG. 5 illustrates an example of the hardware configuration of the FW updating server 8. The hardware configuration of the FW updating server 8 illustrated in FIG. 5 is only an example, and another hardware configuration may be employed as long as it executes the following processing described in this specification.

The FW updating server 8 includes a processor 40, an auxiliary storage device 41, a memory 42, and an NIF circuit 43. The processor 40 executes processing for distributing FW data to the mobile stations 3 in accordance with a computer program stored in the auxiliary storage device 41. The FW data distribution processing will be discussed later. In the auxiliary storage device 41, the computer program executed by the processor 40, data used when executing the computer program, and FW data for the mobile stations 3 are stored. The auxiliary storage device 41 may include a non-volatile memory, a ROM, a hard disk, etc.

In the memory 42, a program which is being executed by the processor 40 and data temporarily used by this program are stored. The memory 42 may include, for example, a RAM. The NIF circuit 43 performs processing for transmitting and receiving signals via fixed communication lines between the FW updating server 8 and the SMS-SC 5, between the FW updating server 8 and the eBM-SC 6, and between the FW updating server 8 and the certificate authority apparatus 9.

2.2.2. Functional Configuration of FW Updating Server 8

Figure 6:
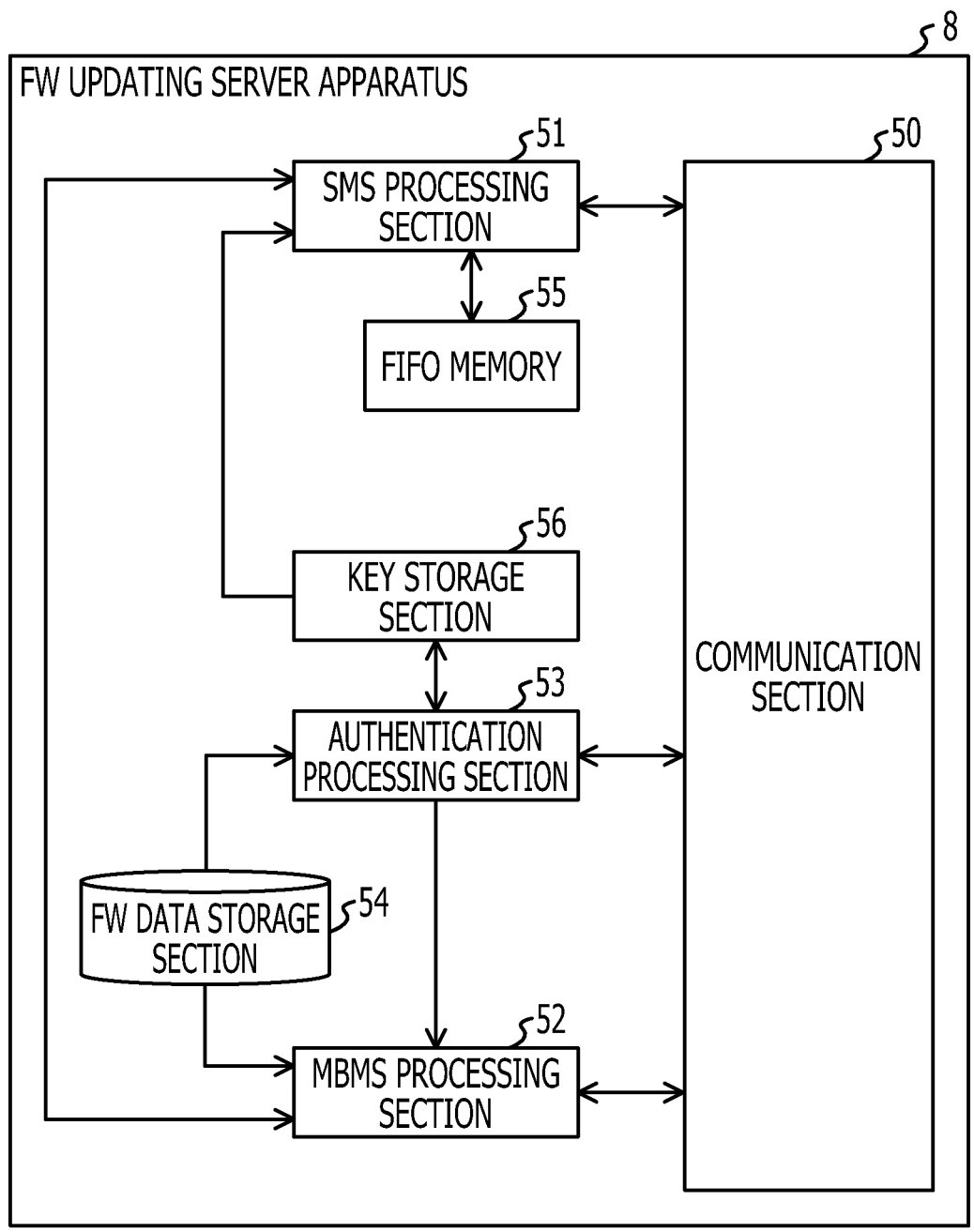
FIG. 6 illustrates a first example of a functional block diagram illustrating the firmware updating server.

The functions of the FW updating server 8 implemented by the above-described hardware configuration will now be described below. FIG. 6 illustrates a first example of a functional block diagram illustrating the FW updating server 8. The FW updating server 8 includes a communication section 50, an SMS processing section 51, an MBMS processing section 52, an authentication processing section 53, an FW data storage section 54, a first-in first-out (FIFO) memory 55, and a key storage section 56. The functions illustrated in FIG. 6 are basic functions, which will be discussed below, and the FW updating server 8 may include components other than the components illustrated in FIG. 6.

The communication section 50 serves to transmit and receive IP packets between the FW updating server 8 and the SMS-SC 5, between the FW updating server 8 and the eBM-SC 6, and between the FW updating server 8 and the certificate authority apparatus 9.

The authentication processing section 53 receives a server certificate, a public key, and a private key from the certificate authority apparatus 9 and stores them in the key storage section 56.

The SMS processing section 51 performs processing for short messages sent and received to and from the mobile stations 3. Short messages which pass through the SMS-SC 5 are encapsulated by using TCP/IP (Transmission Control Protocol/Internet Protocol) tunneling. Upon receiving an updating event occurrence notification from a mobile station 3, the SMS processing section 51 stores the updating event occurrence notification in the FIFO memory 55.

The SMS processing section 51 reads updating event occurrence notifications from the FIFO memory 55 on a first-come, first-served basis. The SMS processing section 51 checks for the presence of updating FW data of a machine type corresponding to TAC of IMEI specified by the terminal identification number indicated in an updating event occurrence notification.

If there is such updating FW data, the authentication processing section 53 reads the private key from the key storage section 56 and the updating FW data from the FW data storage section 54. The authentication processing section 53 encrypts hash values of the updating FW data by using the private key and thereby creates a digital certificate used for performing authentication of the updating FW data by the mobile station 3.

The MBMS processing section 52 transmits the updating FW data read from the FW data storage section 54 and the digital certificate created by the authentication processing section 53 to the eBM-SC 6 as data to be distributed by using MBMS bearer services. The MBMS processing section 52 determines the transmission start time at which the transmission of the updating FW data through the MBMS bearer services will start.

The MBMS processing section 52 may determine the transmission start time by adding a predetermined waiting time to a certain reference time, and may then inform the eBM-SC 6 of the transmission start time. The reference time may be a time at which an updating event occurrence notification was received or processed, or a time at which updating FW data was sent to the eBM-SC 6. In another embodiment, the transmission start time may be obtained from the eBM-SC 6. Alternatively, the MBMS processing section 52 may inform the eBM-SC 6 of the time obtained by adding a predetermined waiting time to the reference time, and then may obtain the transmission start time adjusted to an appropriate time by the eBM-SC 6.

The SMS processing section 51 reads the public key from the key storage section 56 and transmits an updating information notification including the transmission start time, the MBMS bearer identifier of the MBMS bearer services, and the public key to a mobile station 3. After transmitting an updating information notification to a certain mobile station 3-1, before the transmission start time arrives, it is possible that the SMS processing section 51 read from the FIFO memory 55 an updating event occurrence notification received from another mobile station 3-2 of the same machine type as the mobile station 3-1. In this case, the SMS processing section 51 transmits an updating information notification having the same content as that sent to the mobile station 3-1 to the mobile station 3-2.

If the SMS processing section 51 determines that there is no updating FW data, it transmits an updating information absence notification to the mobile station 3.

The above-described operation performed by the communication section 50 is performed by the NIF circuit 43 illustrated in FIG. 5. The above-described processing operations performed by the SMS processing section 51, the MBMS processing section 52, and the authentication processing section 53 are performed by the processor 40. The FW data stored in the FW data storage section 54 and the private key and server certificate stored in the key storage section 56 are stored in the auxiliary storage device 41. Short messages stored in the FIFO memory 55 are stored in the memory 42.

2.3. Description of Operations

2.3.1. Operations of SMS Processing Section 31 of Mobile Station 3

Figure 7A:
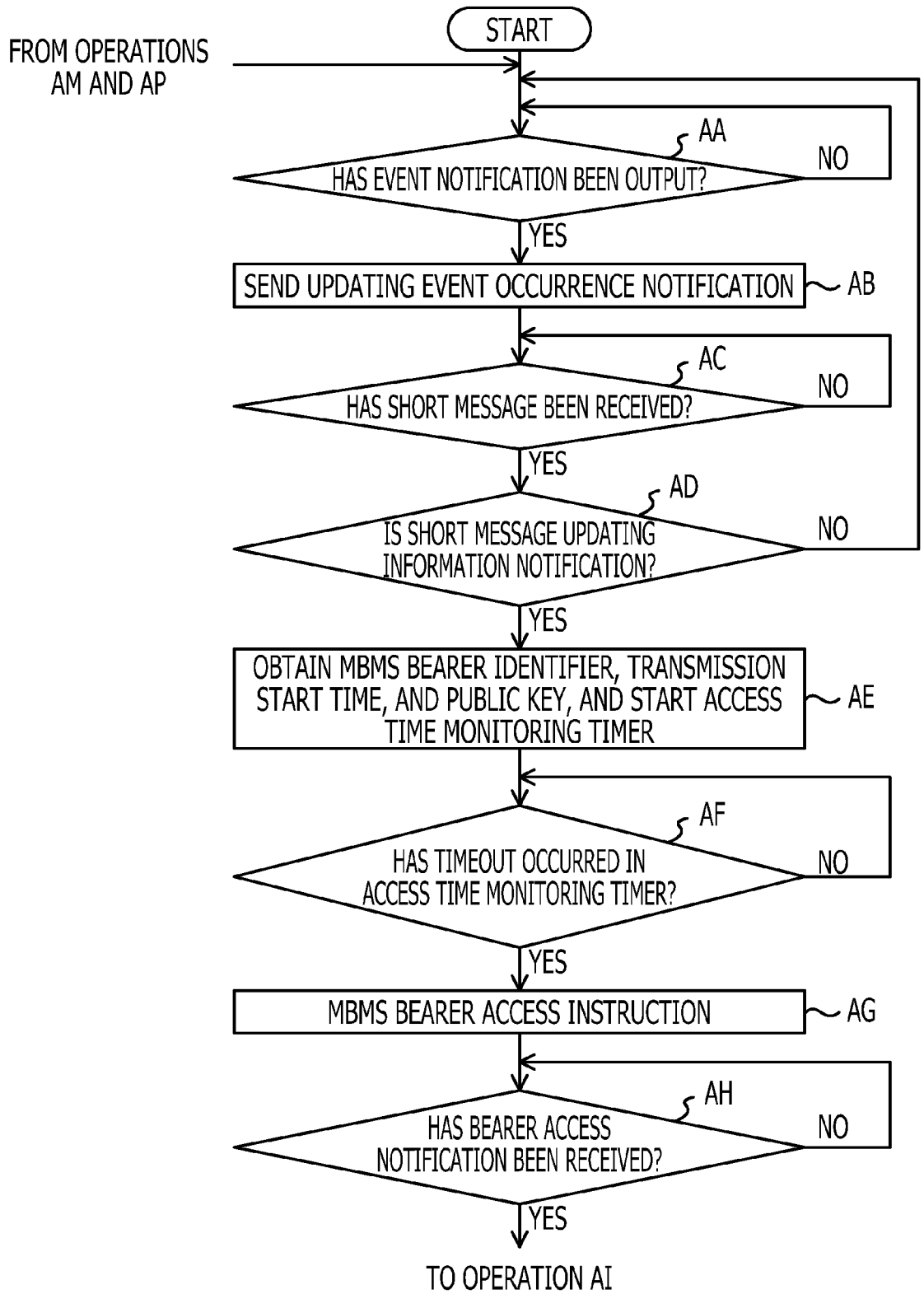
FIGS. 7A and 7B illustrate a first example of operations performed by a short message service processing section of a mobile station.
Figure 7B:
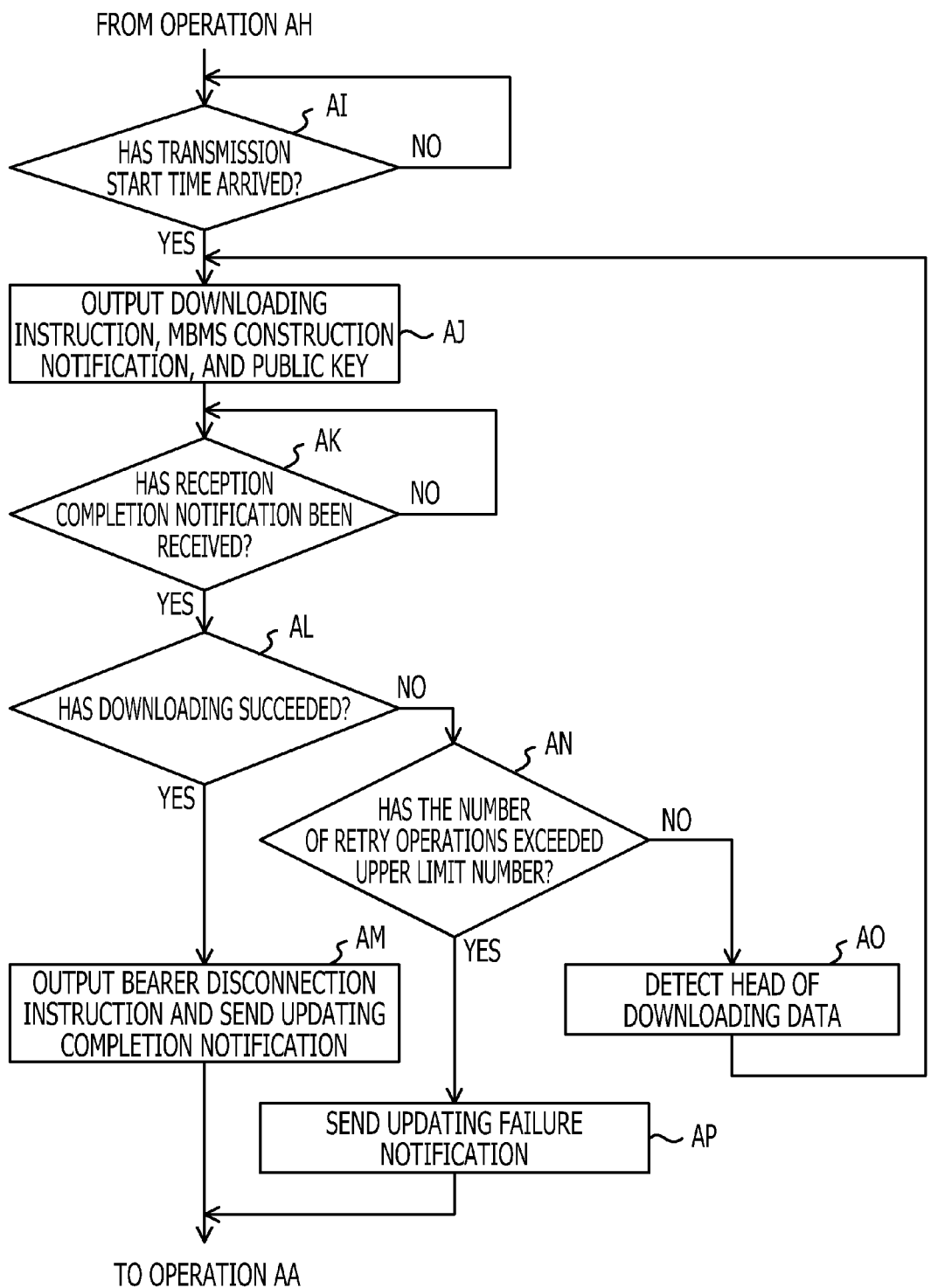

The operations performed by the mobile station 3 and the FW updating server 8 when downloading FW data will be described below. FIGS. 7A and 7B illustrate a first example of operations performed by the SMS processing section 31 of the mobile station 3. A series of operations described with reference to FIGS. 7A and 7B may be interpreted as a method including a plurality of procedures. In this case, an "operation" may be read as a "step". FIGS. 8 through 10, FIGS. 12 through 15, and FIGS. 17 through 19 may be interpreted and read in a similar manner.

In operation AA, the SMS processing section 31 determines whether or not an event notification indicating the occurrence of a predetermined event has been output from the FW updating processing section 34. If an event notification has been output, i.e., if the result of operation AA is YES, the process proceeds to operation AB. If an event notification has not been output, i.e., if the result of operation AA is NO, the process returns to operation AA. In operation AB, the SMS processing section 31 transmits an updating event occurrence notification to the FW updating server 8.

Then, in operation AC, the SMS processing section 31 determines whether or not a short message has been received from the FW updating server 8. If a short message has been received, i.e., if the result of operation AC is YES, the process proceeds to operation AD. If a short message has not been received, i.e., if the result of operation AC is NO, the process returns to operation AC.

In operation AD, the SMS processing section 31 determines whether or not the received short message is an updating information notification. If the short message is an updating information notification, i.e., if the result of operation AD is YES, the process proceeds to operation AE. If the short message is not an updating information notification, i.e., if the result of operation AD is NO, the process returns to operation AA.

In operation AE, the SMS processing section 31 obtains the public key, the MBMS bearer identifier, and the transmission start time from the updating information notification. The SMS processing section 31 also starts an access time monitoring timer. The access time monitoring timer is a timer that monitors the arrival of the time at which MBMS bearer access processing will be started by the MBMS processing section 32. A timeout occurs in the access time monitoring timer before the transmission start time arrives by a predetermined period of time.

After receiving an updating information notification, the mobile station 3 enters the waiting position for a predetermined period of time. This makes it possible to reduce a waste of the power consumption caused by starting an MBMS reception task at too early time before the transmission start time even if the period from when the updating information notification is sent until when the transmission of FW data starts is long. Accordingly, during a certain blank period from when an updating event occurrence notification is received until when the transmission of FW data starts, the FW updating server 8 is able to receive more updating event occurrence notifications from the mobile stations 3 of the same machine type. As a result, the number of mobile stations 3 which simultaneously receive FW data by performing one MBMS distribution operation is increased.

In operation AF, the SMS processing section 31 determines whether or not a timeout has occurred in the access time monitoring timer. If a timeout has occurred in the access time monitoring timer, i.e., if the result of operation AF is YES, the process proceeds to operation AG. If a timeout has not occurred in the access time monitoring timer, i.e., if the result of operation AF is NO, the process returns to operation AF.

In operation AG, the SMS processing section 31 instructs the MBMS processing section 32 to perform MBMS bearer access processing. In response to an access instruction, the MBMS processing section 32 performs access processing for accessing an MBMS bearer through which FW data will be downloaded by the mobile station 3. Upon completion of access processing, the MBMS processing section 32 outputs a bearer access notification to the SMS processing section 31.

In operation AH, the SMS processing section 31 determines whether or not a bearer access notification has been received. If a bearer access notification has been received, i.e., if the result of operation AH is YES, the process proceeds to operation AI. If a bearer access notification has not been received, i.e., if the result of operation AH is NO, the process returns to operation AH. Reference is now made to FIG. 7B.

In operation AI, the SMS processing section 31 determines whether or not the transmission start time has arrived. If the transmission start time has arrived, i.e., if the result of operation AI is YES, the process proceeds to operation AJ. If the transmission start time has not arrived, i.e., if the result of operation AI is NO, the process returns to operation AI.

In operation AJ, the SMS processing section 31 instructs the FW updating processing section 34 to download FW data. At the same time, the SMS processing section 31 outputs an MBMS construction notification indicating the completion of MBMS bearer access processing and the public key to the FW updating processing section 34.

Upon completing the downloading of the FW data, the FW updating processing section 34 outputs a reception completion notification to the SMS processing section 31. The reception completion notification includes information indicating whether or not the downloading of FW data has succeeded. In operation AK, the SMS processing section 31 determines whether or not a reception completion notification has been received. If a reception completion notification has been received, i.e., if the result of operation AK is YES, the process proceeds to operation AL. If a reception completion notification has not been received, i.e., if the result of operation AK is NO, the process returns to operation AK.

In operation AL, the SMS processing section 31 determines whether or not the downloading of FW data has succeeded. If the downloading of FW data has succeeded, i.e., if the result of operation AL is YES, the process proceeds to operation AM. If the downloading of FW data has not succeeded, i.e., if the result of operation AL is NO, the process proceeds to operation AN.

In operation AM, the SMS processing section 31 instructs the MBMS processing section 32 to perform MBMS bearer disconnection processing. The SMS processing section 31 then transmits an updating completion notification to the FW updating server 8. Thereafter, the process returns to operation AA.

In operation AN, the SMS processing section 31 determines whether or not the number of retry operations of downloading has exceeded an upper limit number. If the number of retry operations has exceeded the upper limit number, i.e., if the result of operation AN is YES, the process proceeds to operation AP. If the number of retry operations has not exceeded the upper limit number, i.e., if the result of operation AN is NO, the process proceeds to operation AO.

In operation AO, the SMS processing section 31 detects the head of downloading data to be redistributed, and the process returns to operation AJ to retry downloading. In operation AP, the SMS processing section 31 transmits an updating failure notification to the FW updating server 8. Thereafter, the process returns to operation AA.

2.3.2. Operation of FW Updating Processing Section 34 of Mobile Station

Figure 8:
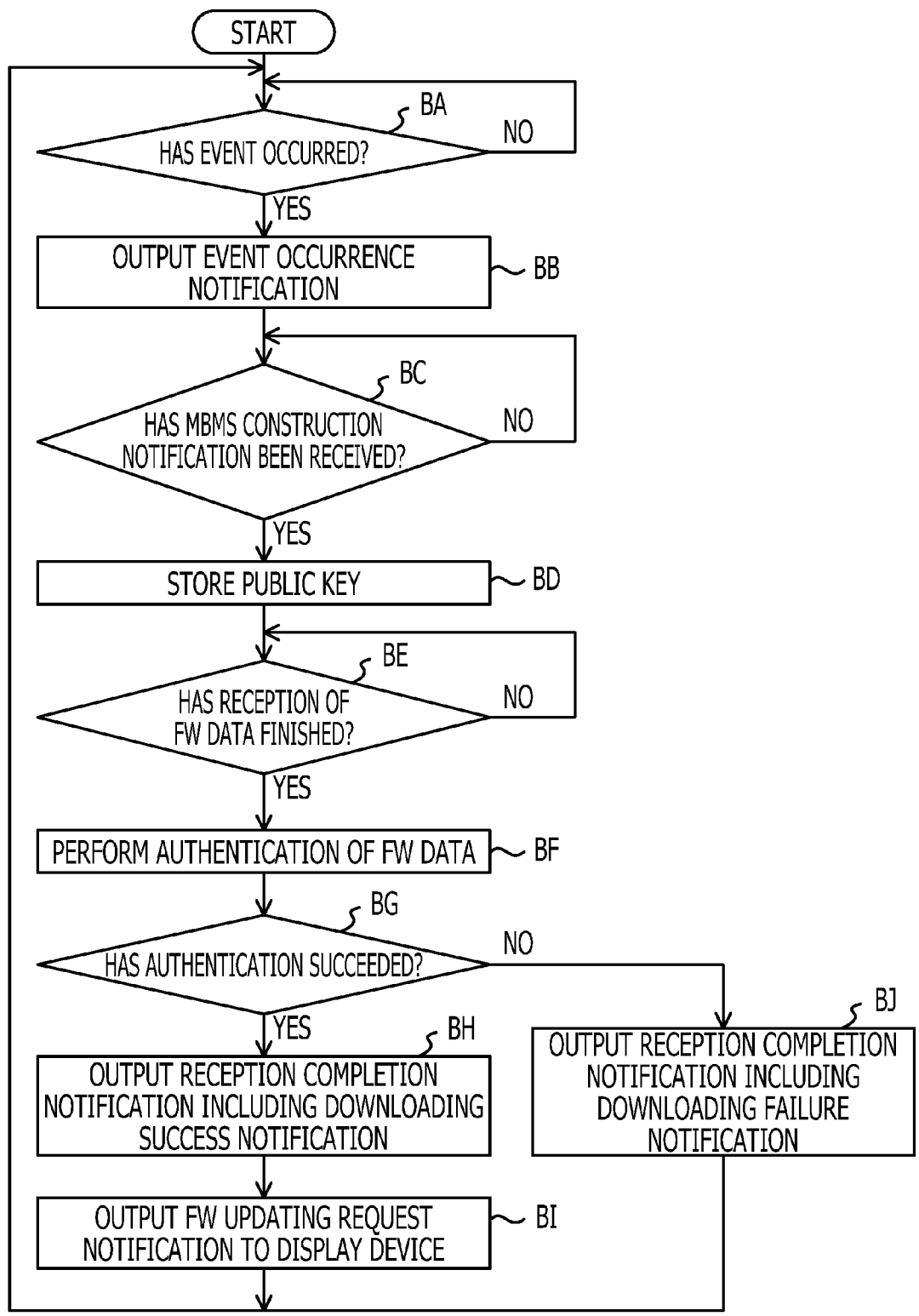
FIG. 8 illustrates an example of an operation performed by a firmware updating processing section of a mobile station.

FIG. 8 illustrates an example of an operation performed by the FW updating processing section 34. In operation BA, the FW updating processing section 34 determines whether or not the event detecting section 33 has detected a predetermined event. If an event has been detected, i.e., if the result of operation BA is YES, the process proceeds to operation BB. If an event has not been detected, i.e., if the result of operation BA is NO, the process returns to operation BA. In operation BB, the FW updating processing section 34 outputs an event occurrence notification to the SMS processing section 31.

In operation BC, the FW updating processing section 34 determines whether or not an MBMS construction notification has been output from the SMS processing section 31. If an MBMS construction notification has been output, i.e., if the result of operation BC is YES, the process proceeds to operation BD. If an MBMS construction notification has not been output, i.e., if the result of operation BC is NO, the process returns to operation BC. In operation BD, the FW updating processing section 34 stores the public key output from the SMS processing section 31 in the key storage section 38.

In operation BE, the FW updating processing section 34 determines whether or not the reception of FW data has finished. If the reception of FW data has finished, i.e., if the result of operation BE is YES, the process proceeds to operation BF. If the reception of FW data has not finished, i.e., if the result of operation BE is NO, the process returns to operation BE.

In operation BF, the FW updating processing section 34 performs authentication of the downloaded FW data. In authentication processing, the FW updating processing section 34 decodes the digital certificate distributed through MBMS by using the public key and thereby reconstructs hash values of the FW data. The FW updating processing section 34 also calculates hash values of the downloaded FW data. If the reconstructed hash values are equal to the calculated hash values, the FW updating processing section 34 determines that the downloaded FW data is authentic. If the reconstructed hash values are not equal to the calculated hash values, the FW updating processing section 34 determines that the downloaded FW data is not authentic.

In operation BG, the FW updating processing section 34 determines whether or not the FW data has been successfully authenticated. If the downloaded FW data is authentic, it means that the FW data has been successfully authenticated. If the downloaded FW data is not authentic, it means that the FW data has not been successfully authenticated. If the FW data has been successfully authenticated, i.e., if the result of operation BG is YES, the process proceeds to operation BH. If the FW data has not been successfully authenticated, i.e., if the result of operation BG is NO, the process proceeds to operation BJ.

In operation BH, the FW updating processing section 34 outputs a reception completion notification including a downloading success notification to the SMS processing section 31. In operation BI, the FW updating processing section 34 outputs an updating request notification, which requests the user to perform an operation for starting updating firmware by using the downloaded FW data, to the display device 18. Thereafter, the process returns to operation BA.

In operation BJ, the FW updating processing section 34 outputs a reception completion notification including a downloading failure notification to the SMS processing section 31. Thereafter, the process returns to operation BA.

2.3.3. Operation of FW Updating Server 8

Figure 9:
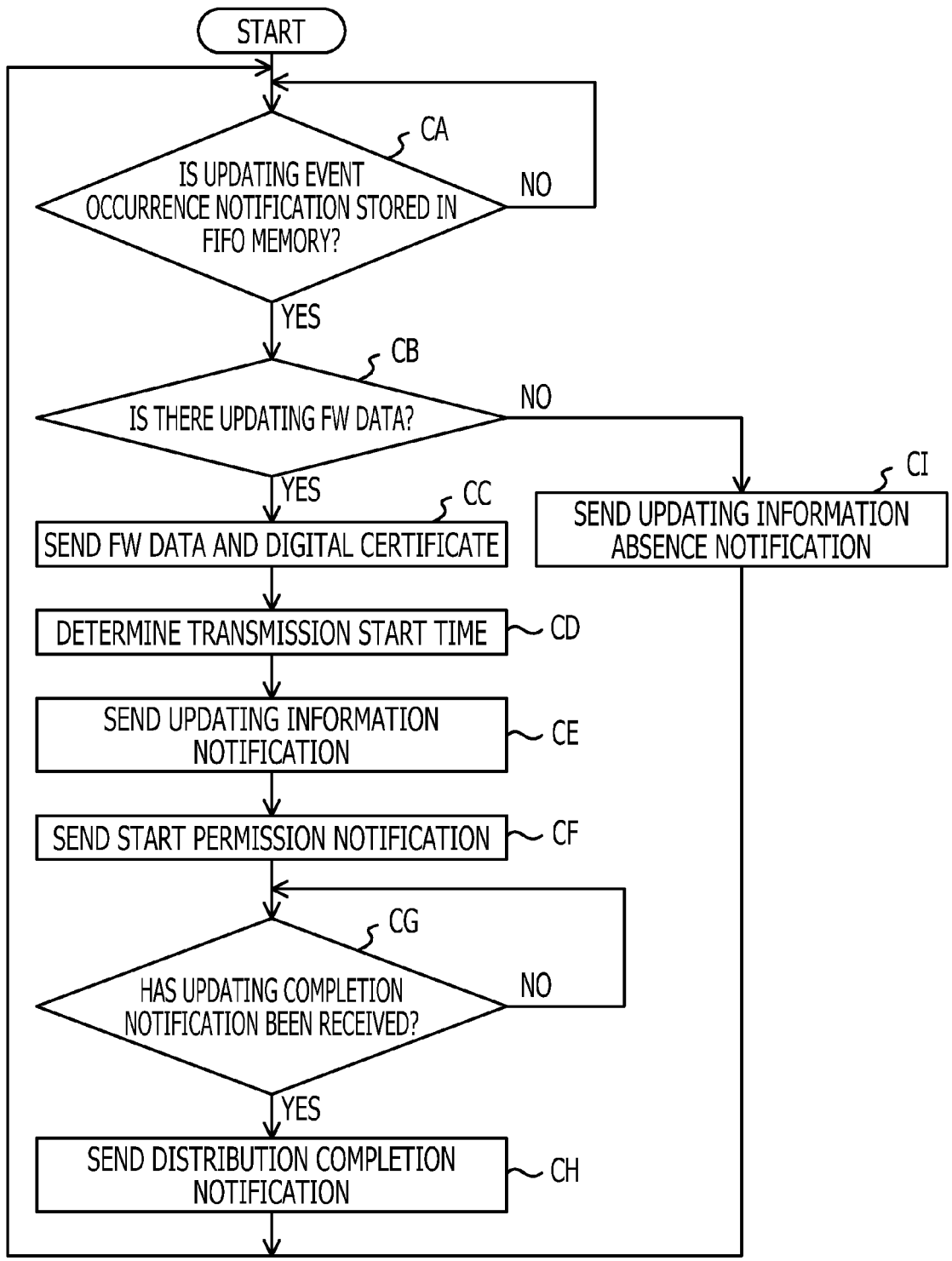
FIG. 9 illustrates a first example of an operation performed by the firmware updating server in response to an updating event occurrence notification.

A description will now be given of an operation performed by the FW updating server 8 upon receiving an updating event occurrence notification from the mobile station 3. FIG. 9 illustrates a first example of an operation performed by the FW updating server 8 in response to an updating event occurrence notification. In operation CA, the SMS processing section 51 determines whether or not an updating event occurrence notification is stored in the FIFO memory 55. If an updating event occurrence notification is stored in the FIFO memory 55, i.e., if the result of operation CA is YES, the process proceeds to operation CB. If an updating event occurrence notification is not stored in the FIFO memory 55, i.e., if the result of operation CA is NO, the process returns to operation CA.

In operation CB, the SMS processing section 51 reads updating event occurrence notifications from the FIFO memory 55 on a first-come first-served basis, and checks for the presence of updating FW data of the machine type corresponding to TAC of the mobile station 3 specified by an updating event occurrence notification. If there is such updating FW data, i.e., if the result of operation CB is YES, the process proceeds to operation CC. If there is no such updating FW data, i.e., if the result of operation CB is NO, the process proceeds to operation CI.

In operation CC, the MBMS processing section 52 transmits updating FW data read from the FW data storage section 54 and a digital certificate created by the authentication processing section 53 to the eBM-SC 6. In operation CD, the MBMS processing section 52 determines the transmission start time of the FW data. In operation CE, the SMS processing section 51 transmits an updating information notification to the mobile station 3.

At the time before the transmission start time arrives by a predetermined period, in operation CF, the MBMS processing section 52 transmits a start permission notification indicating a permission to start distributing the FW data to the eBM-SC 6 and the eMBMSGW 7. Then, the distribution of the FW data starts. In operation CG, the SMS processing section 51 determines whether or not an updating completion notification has been received from the mobile station 3. If an updating completion notification has been received, i.e., if the result of operation CG is YES, the process proceeds to operation CH. If an updating completion notification has not been received, i.e., if the result of operation CG is NO, the process returns to operation CG.

In operation CH, the MBMS processing section 52 transmits a distribution completion notification indicating the completion of distribution of the FW data to the eBM-SC 6 and the e-MBMSGW 7. Thereafter, the process returns to operation CA. If the SMS processing section 51 determines in operation CB that there is no updating FW data, the process proceeds to operation CI, as stated above. In operation CI, the SMS processing section 51 transmits an updating information absence notification to the mobile station 3. Thereafter, the process returns to operation CA.

2.3.4. Signal Sequence

A description will now be given of a sequence of signals transmitted in the communication system 1 when downloading FW data. FIG. 10 illustrates a first example of a sequence of signals transmitted in the communication system 1.

Upon the occurrence of a predetermined event in the mobile station 3, in operation DA, the mobile station 3 transmits an updating event occurrence notification addressed to the FW updating server 8. In operation DB, the SMS-SC 5 relays the updating event occurrence notification to the FW updating server 8. In operation DC, the SMS-SC 5, the control node apparatus 4, and the base station 2, which relay an updating event occurrence notification, transmit the transmitter apparatus a delivery notification indicating that the updating event occurrence notification has been delivered.

If there is updating FW data for the mobile station 3, in operation DD, the FW updating server 8 transmits the FW data and a digital certificate therefor to the eBM-SC 6. In operation DE, the FW updating server 8 determines the transmission start time for the FW data. In operation DF, the FW updating server 8 transmits an updating information notification addressed to the mobile station 3. In operation DG, the SMS-SC 5 relays the updating information notification to the mobile station 3. In operation DH, the control node 4 and the base station 2, which relay an updating information notification, and the mobile station 3, which receives the updating information notification, transmit the transmitter apparatus a delivery notification indicating that the updating information notification has been delivered. In operation DI, the SMS-SC 5 transmits a mobile station response notification indicating that the mobile station 3 has responded to the updating information notification to the FW updating server 8.

At the time, which is indicated by the arrow 100, when the access time monitoring timer of the mobile station 3 detects the arrival of the time at which MBMS bearer access processing will start, the mobile station 3 starts MBMS bearer access processing. In operations DJ and DK, the FW updating server 8 transmits a start permission notification to the eBM-SC 6 and the eMBMSGW 7, respectively. In operation DL, the base station 2 receives the start permission notification which was relayed by the eMBMSGW 7. In operation DM, the base station 2 transmits scheduling information concerning scheduling of the MBMS data channel and the MBMS control channel to the mobile station 3. Then, the mobile station 3 sets parameters for demodulating and coding MBMS distribution data and then starts a reception task of the MBMS distribution data. In operation DN, the mobile station 3 transmits an "Activate MBMS Context Request" message, which activates MBMS bearer services represented by an MBMS bearer identifier specified by the updating information notification, to the eMBMSGW 7.

In operation DO, the eMBMSGW 7 transmits an "Activate MBMS Context Accept" message, which is a response message responding to the "Activate MBMS Context Request" message, to the mobile station 3. In operation DP, the eBM-SC 6 transmits FW data to the mobile station 3 via the eMBMSGW 7, and the mobile station 3 receives the distributed FW data.

If the FW data has been successfully received, in operation DQ, the mobile station 3 transmits an updating completion notification addressed to the FW updating server 8. In operation DR, the SMS-SC 5 relays the updating completion notification to the FW updating server 8. In operation DS, the SMS-SC 5, the control node 4, and the base station 2, which relay an updating completion notification, transmit the transmitter apparatus a delivery notification indicating that the updating completion notification has been delivered.

In operations DT and DU, the FW updating server 8 transmits a completion notification to the eMB-SC 6 and the eMBMSGW 7, respectively. In operation DV, the mobile station 3 transmits a service usage end request indicating that the mobile station 3 has finished using the MBMS bearer services to the eMBMSGW 7. Then, the sequence has been completed.

2.4. Advantages

In the first embodiment, firmware to be downloaded to the mobile station 3 is sent to the mobile station 3 via the MBMS data channel. Accordingly, wireless resources of a dedicated data channel assigned to the mobile station 3 are not used for downloading firmware, thereby reducing a decrease in the quality of other services utilizing the dedicated data channel caused by downloading firmware.

Additionally, MBMS bearer setting information for starting firmware through MBMS is sent and received between the FW updating server 8 and the mobile station 3 by using SMS. Accordingly, wireless resources of a dedicated data channel are not used for transmitting MBMS bearer setting information, thereby reducing a decrease in the quality of other services utilizing the dedicated data channel caused by downloading firmware.

In the first embodiment, upon the occurrence of a predetermined event, such as a fault, in the mobile station 3, the mobile station 3 informs the FW updating server 8 of the occurrence of an event in the form of a short message, thereby making it possible to automatically download updated firmware. In the first embodiment, it is possible to simultaneously download firmware to a plurality of mobile stations 3, thereby increasing the efficiency in utilizing wireless resources of the communication system 1.

In the first embodiment, it is possible to perform authentication of firmware distributed through MBMS, thereby increasing the reliability of the distributed firmware. By performing authentication, it is also possible to detect which part of firmware distributed by utilizing User Datagram Protocol (UDP) is missing.

3. Second Embodiment

A second embodiment will be described below. In the first embodiment, firmware is downloaded through MBMS in response to an event occurrence. In the second embodiment, firmware is also downloaded through MBMS in response to the input of a firmware updating instruction into the mobile station 3 by a user. Accordingly, a short message indicating that an updating instruction has been given from the user is sent to the FW updating server 8.

FIG. 11 illustrates a second example of a list of short messages used for downloading firmware. In FIG. 11, an updating event occurrence notification, an updating information notification, an updating completion notification, an updating failure notification, and an updating information absence notification are similar to those described with reference to FIG. 4.

The list illustrated in FIG. 11 also includes an updating request notification. The updating request notification includes information elements "notification type" and "terminal identification number". In the case of transmitting an updating request notification, the value "0004" may be input. The information element "terminal identification number" indicates IMEI of the mobile station 3.

FIG. 12 illustrates a first example of an operation performed by the mobile station 3 when receiving an updating instruction. In operation EA, the SMS processing section 31 determines whether or not the operation receiving section 36 has received an updating instruction from the user. If an updating instruction has been received, i.e., if the result of operation EA is YES, the process proceeds to operation EB. If an updating instruction has not been received, i.e., if the result of operation EA is NO, the process returns to operation EA. In operation EB, the SMS processing section 31 transmits an updating request notification to the FW updating server 8.

In operation EC, the SMS processing section 31 determines whether or not a short message has been received from the FW updating server 8. If a short message has been received, i.e., if the result of operation EC is YES, the process proceeds to operation ED. If a short message has not been received, i.e., if the result of operation EC is NO, the process returns to operation EC.

In operation ED, the SMS processing section 31 determines whether or not the received short message is an updating information absence notification. If the short message is not an updating information absence notification, i.e., if the result of operation ED is NO, the process proceeds to operation AE illustrated in FIG. 7A. If the short message is an updating information absence notification, i.e., if the result of operation ED is YES, the process proceeds to operation EE. In operation EE, the FW updating processing section 34 outputs a notification indicating that currently used firmware is the latest firmware to the display device 18. Then, the processing has been completed.

Upon receiving an updating request notification from the mobile station 3, the SMS processing section 51 of the FW updating server 8 stores the updating request notification in the FIFO memory 55. The SMS processing section 51 reads updating request notifications from the FIFO memory 55 on a first-come first-served basis, and checks for the presence of updating FW data for the machine type corresponding to TAC of IMEI specified by the terminal identification number indicated in the updating request notification. If there is such updating FW data, the SMS processing section 51 transmits an updating information notification to the mobile station 3 which is a transmitter of the updating request notification, in a manner similar to the case in which an updating event occurrence notification has been received. If there is no such updating FW data, the SMS processing section 51 transmits an updating information absence notification to the mobile station 3.

After transmitting an updating information notification to a certain mobile station 3-1, before the transmission start time arrives, it is possible that an updating request notification arrive from another mobile station 3-2 of the same machine type. In this case, the SMS processing section 51 transmits an updating information notification having the same content as that sent to the mobile station 3-1 to the mobile station 3-2.

Figure 13B:
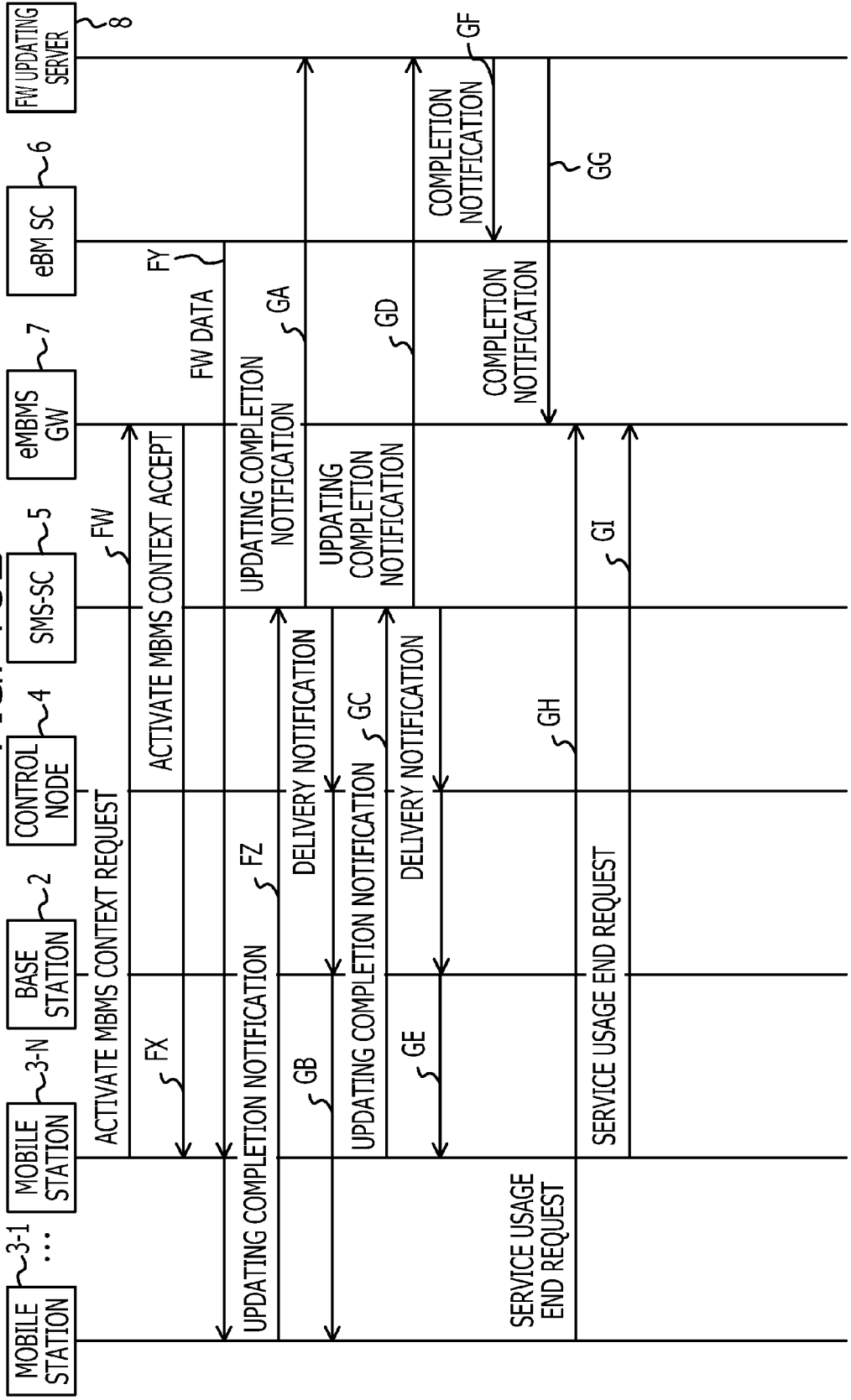

A description will now be given of a sequence of signals transmitted in the communication system 1 when a user inputs an instruction to update firmware. FIGS. 13A and 13B illustrate a second example of a sequence of signals transmitted in the communication system 1. When an updating instruction is input into a mobile station 3-N, in operation FA, the mobile station 3-N transmits an updating request notification addressed to the FW updating server 8. In operation FB, the SMS-SC 5 relays the updating request notification to the FW updating server 8. In operation FC, the SMS-SC 5, the control node 4, and the base station 2, which relay an updating request notification, transmits the transmitter apparatus a delivery notification indicating that the updating request notification has been delivered.

If there is updating FW data for the mobile station 3-N, in operation FD, the FW updating server 8 transmits FW data and a digital certificate therefor to the eBM-SC 6. In operation FE, the FW updating server 8 determines the transmission start time for the FW data. In operation FF, the FW updating server 8 transmits an updating information notification to the mobile station 3-N. In operation FG, the SMS-SC 5 relays the updating information notification to the mobile station 3-N. In operation FH, the control node 4 and the base station 2, which relay an updating information notification, and the mobile station 3-N, which receives an updating information notification, transmits the transmitter apparatus a delivery notification indicating that the updating information notification has been delivered. In operation FI, the SMS-SC 5 transmits a mobile station response notification indicating that the mobile station 3-N has responded to the updating information notification to the FW updating server 8.

Before the lapse of a predetermined period of time after transmitting an updating information notification in operation FF, an updating instruction is input into the mobile station 3-1 of the same machine type as the mobile station 3-N. In operation FJ, the mobile station 3-1 transmits an updating request notification addressed to the FW updating server 8. In operation FK, the SMS-SC 5 relays the updating request notification to the FW updating server 8. In operation FL, the SMS-SC 5, the control node 4, and the base station 2, which relay an updating request notification, transmits the transmitter apparatus a delivery notification indicating that the updating request notification has been delivered.

In operation FM, the FW updating server 8 transmits the same updating information notification as that sent to the mobile station 3-N to the mobile station 3-1. In operation FN, the SMS-SC 5 relays the updating information notification to the mobile-station 3-1. In operation FO, the control node 4 and the base station 2, which relay an updating information notification, and the mobile station 3-1, which receives an updating information notification, transmits the transmitter apparatus a delivery notification indicating that the updating information notification has been delivered. In operation FP, the SMS-SC 5 transmits a mobile station response notification indicating that the mobile station 3-1 has responded to the updating information notification to the FW updating server 8.

At the time, indicated by the arrow 100, when the access time monitoring timer of the mobile station 3 detects the arrival of the time at which MBMS bearer access processing will start, the mobile station 3 starts MBMS bearer access processing. In operations FQ and FR, the FW updating server 8 transmits a start permission notification to the eBM-SC 6 and the eMBMSGW 7, respectively. In operation FS, the base station 2 receives the start permission notification which was relayed by the eMBMSGW 7. In operation FT, the base station 2 transmits scheduling information concerning scheduling of the MBMS data channel and the MBMS control channel to the mobile stations 3-1 and 3-N. Then, the mobile stations 3-1 and 3-N set parameters for demodulating and coding MBMS distribution data and then start a reception task of the MBMS distribution data.

In operation FU, the mobile station 3-1 transmits an Activate MBMS Context Request message to the eMBMSGW 7. In operation FV, the eMBMSGW 7 transmits an Activate MBMS Context Accept message to the mobile station 3-1. Reference will be made to FIG. 13B. In operation FW, the mobile station 3-N transmits an Activate MBMS Context Request message to the eMBMSGW 7. In operation FX, the eMBMSGW 7 transmits an Activate MBMS Context Accept message to the mobile station 3-N.

In operation FY, the eBM-SC 6 distributes FW data to the mobile stations 3-1 and 3-N via the eMBMSGW 7, and the mobile stations 3-1 and 3-N receive the distributed FW data.

If the FW data has been successfully received, in operation FZ, the mobile station 3-1 transmits an updating completion notification addressed to the FW updating server 8. In operation GA, the SMS-SC 5 relays the updating completion notification to the FW updating server 8. In operation GB, the SMS-SC 5, the control node 4, and the base station 2, which relay an updating completion notification, transmit the transmitter apparatus a delivery notification indicating that the updating completion notification has been delivered.

If the FW data has been successfully received, in operation GC, the mobile station 3-N transmits an updating completion notification addressed to the FW updating server 8. In operation GD, the SMS-SC 5 relays the updating completion notification to the FW updating server 8. In operation GE, the SMS-SC 5, the control node 4, and the base station 2, which relay an updating completion notification, transmit the transmitter apparatus a delivery notification indicating that the updating completion notification has been delivered.

In operations GF and GG, the FW updating server 8 transmits a completion notification to the eMB-SC 6 and the eMBMSGW 7, respectively. In operations GH and GI, the mobile stations 3-1 and 3-N transmit a service usage end request to the eMBMSGW 7. Then, the sequence has been completed.

In the second embodiment, when starting downloading firmware in response to an updating instruction given from a user, firmware may also be sent via the MBMS data channel, as in the first embodiment. It is thus possible to reduce a decrease in the quality of other services utilizing a dedicated data channel caused by downloading firmware. Additionally, when starting downloading firmware in response to an updating instruction given from a user, firmware may also be simultaneously downloaded to a plurality of mobile stations 3, as in the first embodiment, thereby improving the efficiency in utilizing wireless resources of the communication system 1.

4. Third Embodiment

Figure 14:
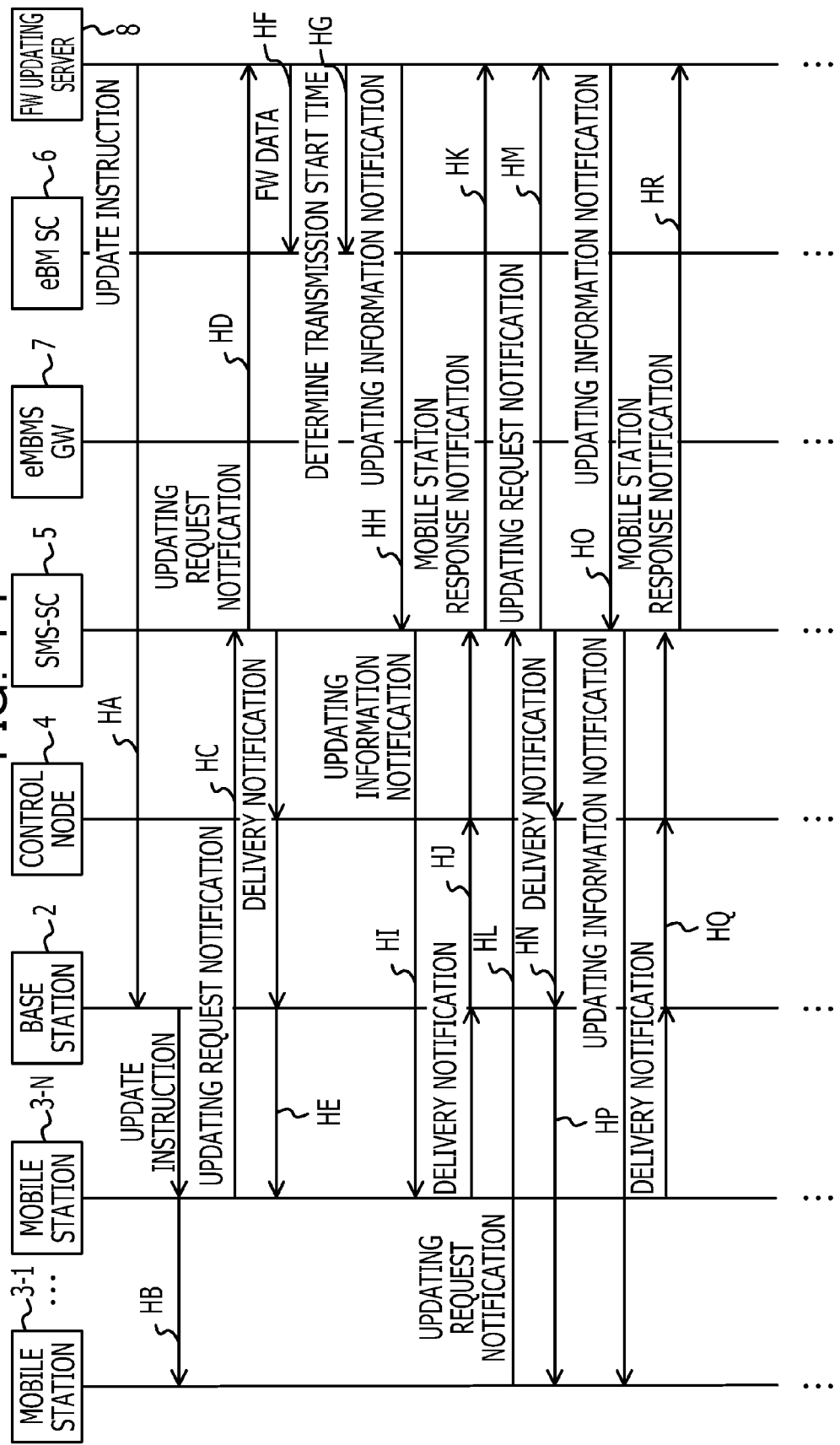
FIG. 14 illustrates a third example of a sequence of signals transmitted in the communication system.

A third embodiment will be described below. In the third embodiment, firmware is downloaded through MBMS in response to a firmware updating notification given from the FW updating server 8. FIG. 14 illustrates a third example of a sequence of signals transmitted in the communication system 1.

In operation HA, the FW updating server 8 transmits an updating instruction message indicating an instruction to update firmware to the mobile stations 3-1 through 3-N. The updating instruction message may be an IP packet signal transmitted in a data channel. In operation HB, the updating instruction message is sent to the mobile stations 3-1 through 3-N via the base station 2.

An application which is operating in the mobile station 3-N that has received the updating instruction message informs the SMS processing section 31 of the mobile station 3-N that the updating instruction message has been received. In operation HC, the mobile station 3-N transmits an updating request notification addressed to the FW updating server 8. Operations HD through HK are similar to operations FB through FI, respectively, illustrated in FIG. 13A. Before the lapse of a predetermined period of time after transmitting an updating information notification to the mobile station 3-N in operation HH, in operation HL, the mobile station 3-1 that has received the updating instruction message also transmits an updating request notification addressed to the FW updating server 8. The mobile station 3-1 is the same machine type as that of the mobile station 3-N. The subsequent operations are similar to operations FK through GI illustrated in FIGS. 13A and 13B. The other mobile stations 3 that have received the updating instruction message may also transmit an updating request notification in a similar manner.

In the third embodiment, when starting downloading firmware in response to an updating notification given from the FW updating server 8, firmware may also be sent via the MBMS data channel, as in the first or second embodiment. It is thus possible to reduce a decrease in the quality of other services utilizing a dedicated data channel caused by downloading firmware. Additionally, when starting downloading firmware in response to an updating notification given from the FW updating server 8, firmware may also be simultaneously downloaded to a plurality of mobile stations 3, thereby improving the efficiency in utilizing wireless resources of the communication system 1, as in the first or second embodiment.

5. Fourth Embodiment

A fourth embodiment will be described below. In the fourth embodiment, when distributing FW data through MBMS in response to an updating event occurrence notification given from a certain mobile station 3, FW data is also distributed through MBMS to another mobile station 3 that has sent an updating request notification. If FW data is not distributed in response to an event occurrence notification, FW data is sent via a data channel to a mobile station 3 that has sent an updating request notification.

Figure 15:
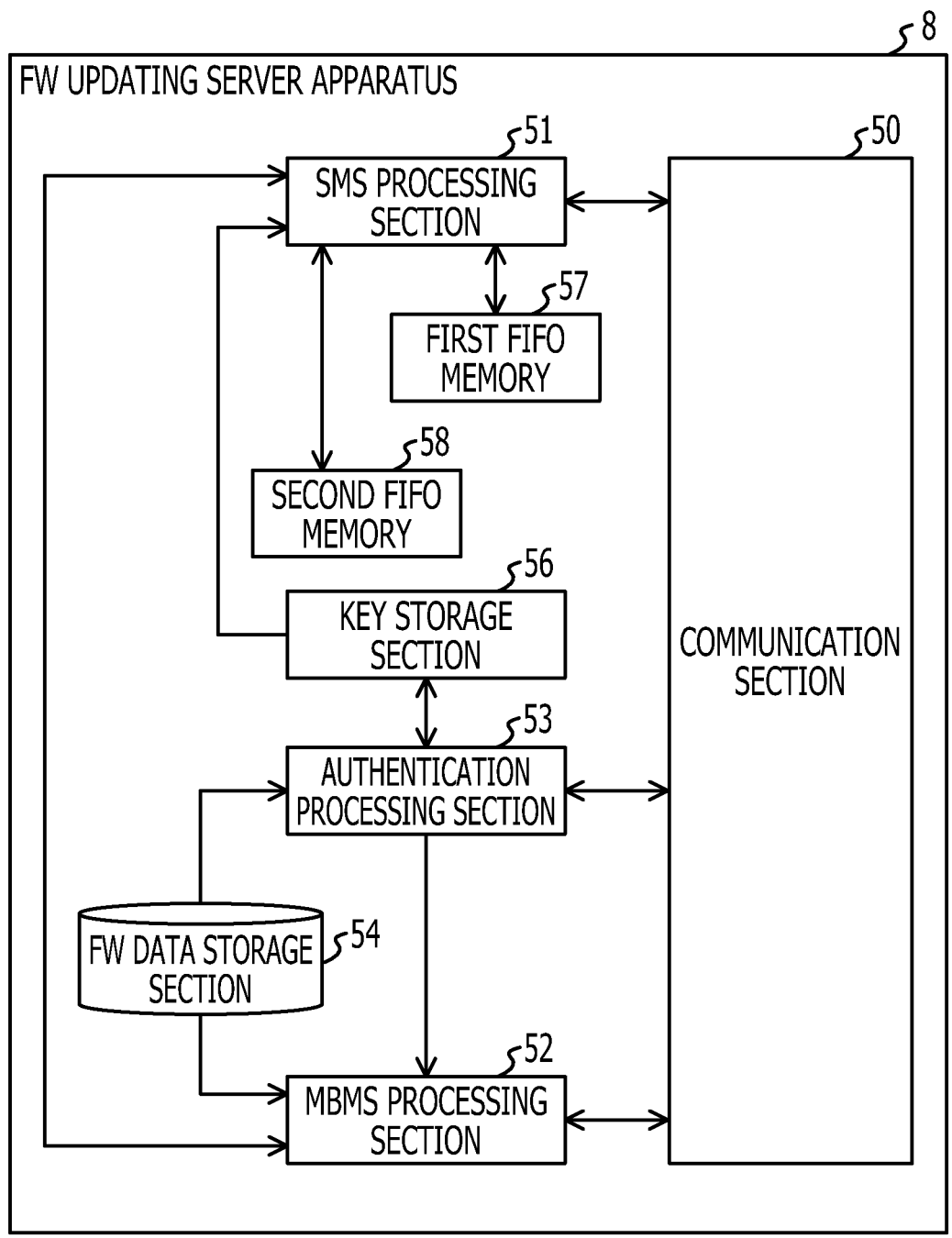
FIG. 15 illustrates a second example of a functional block diagram illustrating the firmware updating server.

FIG. 15 illustrates a second example of a functional block diagram illustrating the FW updating server 8. In FIG. 15, the same components as those illustrated in FIG. 6 are designated by like reference numerals. A description of the same operations as those performed by the components discussed with reference to FIG. 6 will be omitted.

The FW updating server 8 includes a first FIFO memory 57 in which updating event occurrence notifications are stored and a second FIFO memory 58 in which updating request notifications are stored. The functions illustrated in FIG. 15 are basic functions, which will be discussed below, and the FW updating server 8 may include components other than the components illustrated in FIG. 15. Short messages stored in the first and second FIFO memories 57 and 58 are stored in the memory 42 illustrated in FIG. 5.

Upon receiving an updating event occurrence notification from a mobile station 3, the SMS processing section 51 stores it in the first FIFO memory 57. Upon receiving an updating request notification from a mobile station 3, the SMS processing section 51 stores it in the second FIFO memory 58.

The SMS processing section 51 reads updating event occurrence notifications from the first FIFO memory 57 on a first-come first-served basis. When transmitting an updating information notification in response to an updating event occurrence notification, the SMS processing section 51 reads an updating request notification from the second FIFO memory 58. If the machine type of the mobile station 3 that has sent the updating request notification is the same as that of the mobile station 3 that has sent an updating event occurrence notification, the SMS processing section 51 also transmits the updating information notification to the mobile station 3 that has sent the updating request notification. The updating information notification to be sent to the mobile station 3 that has sent the updating request notification may be the same as that sent to the mobile station 3 that has sent the updating event occurrence notification.

If there is an updating event occurrence notification in the first FIFO memory 57 or if there is an updating request notification in the second FIFO memory 58 during a predetermined period after an updating information notification was sent to a mobile station 3 that sent an updating event occurrence notification, the SMS processing section 51 may also transmit the same updating information notification to a mobile station 3 that has sent the updating event occurrence notification stored in the first FIFO memory 57 or the updating request notification stored in the second FIFO memory 58. This predetermined period may end at a certain margin period before the FW data transmission start time arrives.

If there is no updating event occurrence notification in the first FIFO memory 57, the SMS processing section 51 reads updating request notifications from the second FIFO memory 58 on a first-come first-served basis, and checks for the presence of updating FW data for the machine type corresponding to TAC of IMEI specified by the terminal identification number indicated in an updating request notification read from the second FIFO memory 58. If there is such updating FW data, the SMS processing section 51 transmits an updating information notification including information indicating that firmware will be updated to the mobile station 3 that has sent the updating request notification. If there is no such updating FW data, the SMS processing section 51 transmits an updating information absence notification including information indicating that firmware will not be updated to the mobile station 3.

If the received updating information absence notification includes information indicating that firmware will be updated, the SMS processing section 31 of the mobile station 3 informs the updating instruction processing section 37 that firmware will be updated. The updating instruction processing section 37 then performs processing for receiving updating FW data from the FW updating server 8. In this case, the FW data is downloaded via a data channel.

Figure 16:
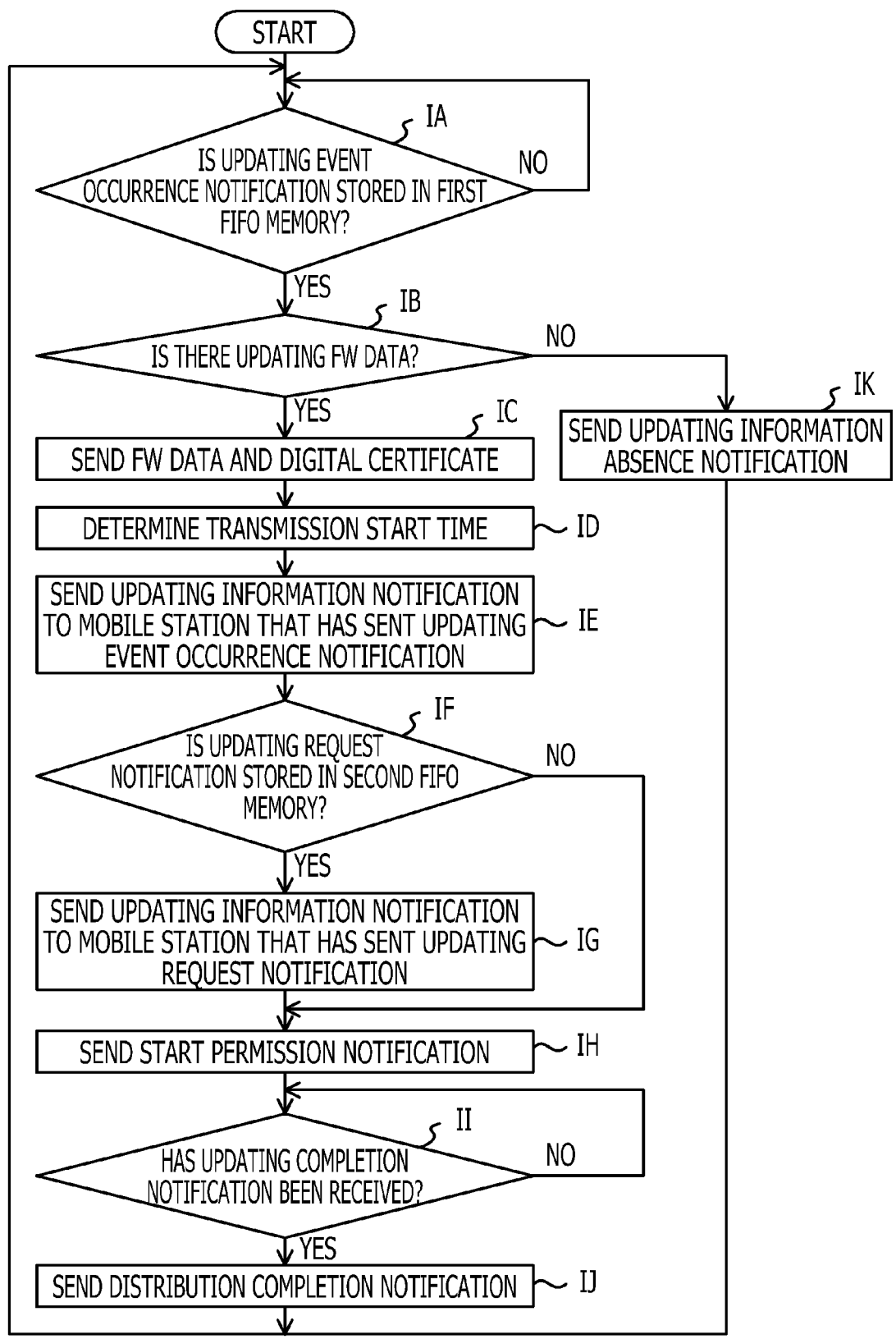
FIG. 16 illustrates a second example of an operation performed by the firmware updating server in response to an updating event occurrence notification.

Operations performed by the FW updating server 8 and the mobile stations 3 in the fourth embodiment will now be described below. FIG. 16 illustrates a second example of an operation performed by the FW updating server 8 in response to an updating event occurrence notification. Operations IA through IE in FIG. 16 are similar to operations CA through CE, respectively, illustrated in FIG. 9, except that the FIFO memory 55 is read as the first FIFO memory 57.

In operation IF, the SMS processing section 51 determines whether or not an updating request notification is stored in the second FIFO memory 58. If an updating request notification is stored in the second FIFO memory 58, i.e., if the result of operation IF is YES, the process proceeds to operation IG. If an updating request notification is not stored in the second FIFO memory 58, i.e., if the result of operation IF is NO, the process proceeds to operation IH.

In operation IG, the SMS processing section 51 reads an updating request notification stored in the second FIFO memory 58. If the machine type of the mobile station 3 that has sent the updating request notification is the same as that of the mobile station 3 to which the updating information notification has been sent in operation IE, the SMS processing section 51 also transmits the updating information notification to the mobile station 3 that has sent the updating request notification. Operations IH through IK are similar to those of operation CF through CI, respectively, illustrated in FIG. 9.

Figure 17:
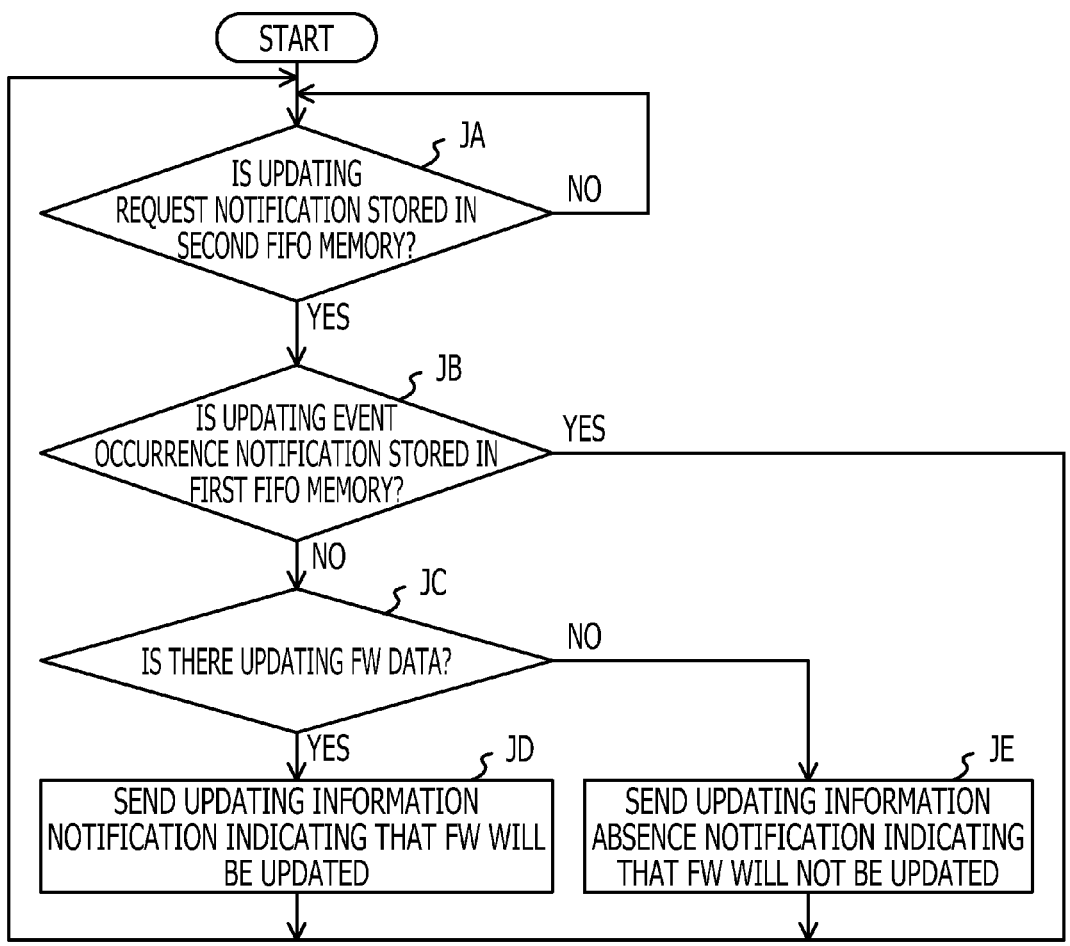
FIG. 17 illustrates an example of an operation performed by the firmware updating server in response to an updating request notification.

FIG. 17 illustrates an example of an operation performed by the FW updating server 8 in response to an updating request notification. In operation JA, the SMS processing section 51 determines whether or not an updating request notification is stored in the second FIFO memory 58. If an updating request notification is stored in the second FIFO memory 58, i.e., if the result of operation JA is YES, the process proceeds to operation JB. If an updating request notification is not stored in the second FIFO memory 58, i.e., if the result of operation JA is NO, the process returns to operation JA.

In operation JB, the SMS processing section 51 determines whether or not an updating event occurrence notification is stored in the first FIFO memory 57. If an updating event occurrence notification is stored in the first FIFO memory 57, i.e., if the result of operation JB is YES, the process returns to operation JA without executing any processing since an updating information notification has already been sent in operation IG in FIG. 16. If an updating event occurrence notification is not stored in the first FIFO memory 57, i.e., if the result of operation JB is NO, the process proceeds to operation JC.

In operation JC, the SMS processing section 51 reads updating request notifications from the second FIFO memory 58 on a first-come, first-served basis, and checks for the presence of updating FW data for the machine type corresponding to TAC of IMEI of the mobile station 3 specified by the updating request notification. If there is such updating FW data, i.e., if the result of operation JC is YES, the process proceeds to operation JD. If there is no such updating FW data, i.e., if the result of operation JC is NO, the process proceeds to operation JE.

In operation JD, the SMS processing section 51 transmits an updating information notification including information indicating that firmware will be updated to the mobile station 3. The process then returns to operation JA. In operation JE, the SMS processing section 51 transmits an updating information absence notification including information indicating that firmware will not be updated to the mobile station 3. The process then returns to operation JA.

Figure 18:
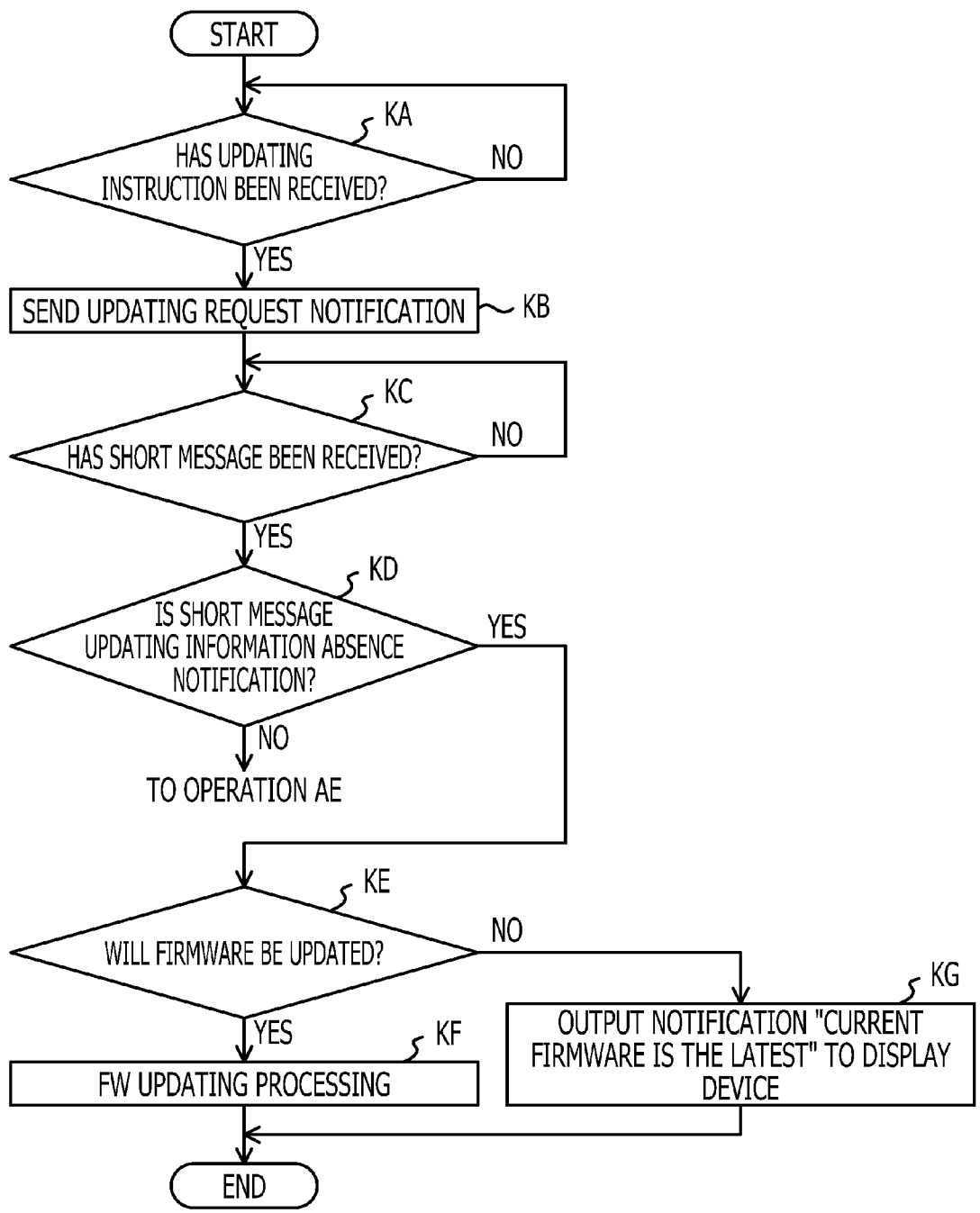
FIG. 18 illustrates a second example of an operation performed by a mobile station when receiving an updating instruction.

FIG. 18 illustrates a second example of an operation performed by the mobile station 3 when receiving an updating instruction. Operations KA through KD are similar to operations EA through ED, respectively, illustrated in FIG. 12. An updating instruction received in operation KA may be a firmware updating instruction from the FW updating server 8 as in the third embodiment.

In operation KE, the SMS processing section 31 determines whether or not the received updating information absence notification includes information indicating that firmware will be updated. If the received updating information absence notification includes information indicating that firmware will be updated, i.e., if the result of operation KE is YES, the process proceeds to operation KF. If the received updating information absence notification does not include information indicating that firmware will be updated, i.e., if the result of operation KE is NO, the process proceeds to operation KG.

In operation KF, the SMS processing section 31 informs the updating instruction processing section 37 that firmware will be updated. The updating instruction processing section 37 then receives updating FW data from the FW updating server 8 via a data channel. Then, the processing has been completed. In operation KG, the updating instruction processing section 37 outputs a notification indicating that currently used firmware is the latest firmware to the display device 18. Then, the processing has been completed.

In the fourth embodiment, downloading of FW data in response to an updating event occurrence notification may be preferentially performed by utilizing MBMS. Accordingly, in the case of emergency, such as a fault occurring in the mobile station 3, in which firmware has to be urgently downloaded, firmware may be updated more promptly and urgently for urgent cases than for other cases.

Additionally, when downloading updating data through MBMS in response to an updating event occurrence notification, updating data may be simultaneously downloaded in response to an updating instruction from a user or a firmware updating instruction from the FW updating server 8, thereby improving the efficiency in utilizing wireless resources in the communication system 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data distribution apparatus comprising:
a processor to perform transmitting processing for transmitting updating data used for updating data stored in a wireless communication apparatus,
wherein, when performing the transmitting processing, the processor transmits the updating data to a control apparatus which controls a multicast service bearer,
transmits a message including setting information concerning settings of the multicast servicer bearer to the wireless communication apparatus, and
transmits a distribution start request signal indicating a request to start distributing the updating data to the control apparatus
wherein the processor further determines whether or not a message has been received from the wireless communication apparatus, and
when a message has been received, the processor performs the transmitting processing,
wherein, when the message received from the wireless communication apparatus is a first message, the processor transmits a message including the setting information to the wireless communication apparatus,
when the message received from the wireless communication apparatus is a second message, the processor transmits a message indicating that the updating data will not be sent through the multicast service bearer to the wireless communication apparatus, and
when messages received from a plurality of the wireless communication apparatuses include the first and second messages, the processor transmits the setting information to a wireless communication apparatus that has sent the second message.

* * * * *